(12) United States Patent
Sample et al.

(10) Patent No.: US 8,612,491 B2
(45) Date of Patent: Dec. 17, 2013

(54) SYSTEM AND METHOD FOR STORING A DATASET OF IMAGE TILES

(75) Inventors: John T. Sample, Pearl River, LA (US); Elias Z K Ioup, New Orleans, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/544,599

(22) Filed: Jul. 9, 2012

(65) Prior Publication Data

US 2013/0103648 A1 Apr. 25, 2013

Related U.S. Application Data

(60) Provisional application No. 61/551,112, filed on Oct. 25, 2011.

(51) Int. Cl.
  *G06F 17/30* (2006.01)
(52) U.S. Cl.
  USPC .......... 707/805; 707/707; 707/696; 707/763; 707/737; 709/201; 709/203; 709/213; 709/217; 382/113; 701/56; 340/995.1; 345/660

(58) Field of Classification Search
  USPC ......... 707/769, 912, 915, 918–920, 696, 763, 707/737; 709/201, 203, 213, 217; 382/113; 701/56, 200; 340/995.1; 345/660
  See application file for complete search history.

(56) References Cited

U.S. PATENT DOCUMENTS

| | | | |
|---|---|---|---|
| 7,995,079 B2 * | 8/2011 | Bells et al. ................... 345/660 |
| 8,149,249 B1 * | 4/2012 | Oplinger ...................... 345/661 |
| 8,274,524 B1 * | 9/2012 | Cornell et al. ............... 345/581 |
| 8,320,021 B2 * | 11/2012 | Murakami ................... 358/3.06 |
| 2008/0253757 A1 * | 10/2008 | Bells et al. ...................... 396/77 |
| 2011/0191014 A1 * | 8/2011 | Feng et al. .................... 701/200 |
| 2011/0249032 A1 * | 10/2011 | Bells et al. ................... 345/660 |
| 2011/0258563 A1 * | 10/2011 | Lincke ......................... 715/760 |
| 2012/0299965 A1 * | 11/2012 | Agarwal et al. .............. 345/660 |

OTHER PUBLICATIONS

Sample, J., Ioup, E., Tile-Based Geospatial Information Systems, Principles and Practices, Springer, LaVergne, TN 20817LV00005B/4/P (Dec. 8, 2010).

U.S. Appl. No. 61/551,112; Inventor: John Sample, et al, Filing date: Oct. 26, 2011; Confirmation No. 4117.

* cited by examiner

*Primary Examiner* — Frantz Coby
(74) *Attorney, Agent, or Firm* — US Naval Research Laboratory; Amy L. Ressing; Kathleen Chapman

(57) ABSTRACT

System and method for storing a dataset of image tiles.

6 Claims, 35 Drawing Sheets

$$DDP = \frac{360.0}{2^l} p$$

$p \equiv$ NUMBER OF PIXELS PER TILE
$l \equiv$ ZOOM LEVEL

| ZOOM LEVEL | NUMBER OF COLUMNS | NUMBER OF ROWS | NUMBER OF TILES | DEGREES PER PIXEL |
|---|---|---|---|---|
| 1 | 2 | 1 | 2 | 0.351562500 |
| 2 | 4 | 2 | 8 | 0.175781250 |
| 3 | 8 | 4 | 32 | 0.087890625 |
| 4 | 16 | 8 | 128 | 0.043945313 |
| 5 | 32 | 16 | 512 | 0.021972656 |
| 6 | 64 | 32 | 2048 | 0.010986328 |
| 7 | 128 | 64 | 8192 | 0.005493164 |
| 8 | 256 | 128 | 32768 | 0.002746582 |
| 9 | 512 | 256 | 131072 | 0.001373291 |
| 10 | 1024 | 512 | 524288 | 0.000686645 |
| 11 | 2048 | 1024 | 2097152 | 0.000343323 |
| 12 | 4096 | 2048 | 8388608 | 0.000171661 |
| 13 | 8192 | 4096 | 33554432 | 0.000085831 |
| 14 | 16384 | 8192 | 134217728 | 0.000042915 |
| 15 | 32768 | 16384 | 536870912 | 0.000021457 |
| 16 | 65536 | 32768 | 2147483648 | 0.000010729 |
| 17 | 131072 | 65536 | 8589934592 | 0.000005364 |
| 18 | 262144 | 131072 | 34359738368 | 0.000002682 |
| 19 | 524288 | 262144 | 137438953472 | 0.000001341 |
| 20 | 1048576 | 524288 | 549755813888 | 0.000000706 |

| IMAGE SIZE | JPEG BYTES | PNG BYTES | JPEG OVERHEAD PERCENTAGE | PNG OVERHEAD PERCENTAGE |
|---|---|---|---|---|
| 1 X 1 | 632 | 69 | 100.0% | 100.0% |
| 64 X 64 | 2019 | 8632 | 31.30% | 0.61% |
| 128 X 128 | 4912 | 30724 | 12.87% | 0.22% |
| 256 X 256 | 14287 | 111642 | 4.43% | 0.06% |
| 512 X 512 | 43424 | 410782 | 1.46% | 0.017% |
| 1024 X 1024 | 135570 | 1515218 | 0.47% | 0.0046% |
| 2048 X 2048 | 423298 | 5526685 | 0.15% | 0.0012% |
| 4096 X 4096 | 1309545 | 1951354 | 0.046% | 0.00035% |
| 8192 X 8192 | 4549578 | 6279629 | 0.014% | 0.00011% |

```
public static void tileSizeOptimization1() {
    int numlocations = 10000;
    int[] tilesizes = new int[] {16, 32, 64, 128, 256, 512, 1024, 2048};

int scale = 10;
    int viewWidth = 1024;
    int viewHeight = 768;

int numpoints = numlocations;
    Point2Double[] randomPoints = getRandomPoints(numpoints);
    int[] totalTilesAccessed = new int[tilesizes.length];
    long[] totalPixelsWasted = new long[tilesizes.length];
    for (int i = 0; i < tilesizes.length; i++) {
        BoundingBox[] bb = getRandomMapViews(randomPoints, scale,
tilesizes[i], viewWidth, viewHeight);
        int[] tilesAccessed = getTilesAccessed(bb, scale);
        long[] pixelsWasted = getWastedPixels(tilesAccessed, scale,
viewWidth, viewHeight, tilesizes[i]);
        totalTilesAccessed[i] = 0;
        for (int j = 0; j < numlocations; j++) {
            totalTilesAccessed[i] += tilesAccessed[j];
            totalPixelsWasted[i] += pixelsWasted[j];
        }
    } for (int i = 0; i < totalTilesAccessed.length; i++) {
        System.out.println(totalTilesAccessed[i] / 10000.0);
    }
    for (int i = 0; i < totalTilesAccessed.length; i++) {
        System.out.println(totalPixelsWasted[i] / 10000.0);
    }
}
```

```
public static BoundingBox[] getRandomMapViews (Point2DDouble[]
centerPoints, int scale, int tilesize, int viewWidth, int viewHeight) {
    //these two are always the same
    double tileWidthDegrees = 360.0 / Math.pow(2, scale);

double tileHeightDegrees = 180.0 / Math.pow(2, scale - 1);

double degreesPerPixel = tileWidthDegrees / tilesize;
    double viewWidthDegrees = viewWidth * degreesPerPixel;
    double viewHeightDegrees = viewHeight * degreesPerPixel;

BoundingBox[] boxes = new BoundingBox[centerPoints.length];
    for (int i = 0; i < boxes.length; i++) {
        double centerX = centerPoints[i].x;
        double centerY = centerPoints[i].y;
        double minx = centerX - viewWidthDegrees / 2.0;
        double maxx = centerX + viewWidthDegrees / 2.0;
        double miny = centerY - viewHeightDegrees / 2.0;
        double maxy = centerY + viewHeightDegrees / 2.0;
        BoundingBox bb = new BoundingBox(minx, miny, maxx, maxy);
        boxes[i] = bb;
    }
    return boxes;
}
```

FIG. 8B

| TILE SIZE | NUMBER OF TILES ACCESSED | WASTED PIXELS |
|---|---|---|
| 16 | 3185.0 | 28928.0 |
| 32 | 825.0 | 58368.0 |
| 64 | 221.0 | 116784.0 |
| 128 | 63.0 | 245760.0 |
| 256 | 20.0 | 524288.0 |
| 512 | 7.5021 | 1180198.5024 |
| 1024 | 3.4938 | 2877082.8288 |
| 2048 | 2.0877 | 7266130.3808 |

| TILE SIZE | DECODE TIME JPEG (MILLISECONDS) | DECODE TIME PNG (MILLISECONDS) |
|---|---|---|
| 16 | 2.5 | 2.34 |
| 32 | 2.5 | 2.5 |
| 64 | 2.66 | 3.12 |
| 128 | 3.91 | 4.22 |
| 256 | 5.0 | 7.97 |
| 512 | 10.94 | 21.1 |
| 1024 | 31.56 | 69.22 |
| 2048 | 113.75 | 268.44 |

TABLE 4.7 DECODE TIMES FOR JPEG AND PNG TILES

BoundingBox: Simple wrapper for rectangular bounding coordinates in degrees
SourceImage: Wrapper for image dimensions and geographic bounds
TileAddress: Wrapper for a tile's row, column and scale coordinates
BufferedImage: Built-in Java class for memory images
TileOutputStream: Abstract class for output of tiled images.
MemoryImageCache: Abstract class for a LRU cache of source images.

%%%%%%%%%%%%%%%%%%%%%%%%%%%%%%%%%%%%%%%%

```
class BoundingBox { double minx, miny, maxx, maxy;

public BoundingBox(double minx, double miny, double maxx, double maxy) {
        this.maxx = maxx;
        this.maxy = maxy;
        this.minx = minx;
        this.miny = miny;
    }
    boolean intersects(double minx, double miny, double maxx, double maxy) {
        return !(minx > this.maxx || maxx < this.minx || miny > this.maxy || maxy < this.miny);
    }
    static BoundingBox union(BoundingBox[] bb) {
        BoundingBox u = bb[0];
        for (int i = 1; i < bb.length; i++) {
            if (bb[i].maxx > u.maxx) {
                u.maxx = bb[i].maxx;
            }
            if (bb[i].maxy > u.maxy) {
                u.maxy = bb[i].maxy;
            }
            if (bb[i].minx < u.minx) {
                u.minx = bb[i].minx;
            }
            if (bb[i].miny < u.miny) {
                u.miny = bb[i].miny;
            }
        }
        return u;
    }
}
```

FIG. 13A-1

```
class SourceImage { int width;
    int height;
    BoundingBox bb;
    BufferedImage image;
    String name;
} class TileAddress { long row;
    long column;
    int scale;

BoundingBox getBoundingBox() {
        double dp = 360.0 / (Math.pow(2, scale) * TILE_SIZE);
        double miny = (row * TILE_SIZE * dp) - 90.0;
        double maxy = ((row + 1) * TILE_SIZE * dp) - 90.0;
        double minx = (column * TILE_SIZE * dp) - 180.0;
        double maxx = ((column + 1) * TILE_SIZE * dp) - 180.0;
        BoundingBox bb = new BoundingBox(minx, miny, maxx, maxy);
        return bb;
    }
} abstract class TileOutputStream { abstract void writeTile(TileAddress address, BufferedImage image);
}
abstract class MemoryImageCache { abstract BufferedImage getSourceImageData(String name);

abstract void putSourceImageData(String name, BufferedImage data);
```

FIG. 13A-2

```
    public void createTiles(SourceImage[] sourceImages, TileOutputStream
tileOutputStream, int baseScale, MemoryImageCache cache) {

//Determine the geographic bounds of the tile set.
        //This can be based on the bounds of the source images.
        BoundingBox[] sourceImageBounds = new
BoundingBox[sourceImages.length];
        for (int i = 0; i < sourceImageBounds.length; i++) {
            sourceImageBounds[i] = sourceImages[i].bb;
        }
        BoundingBox tileSetBounds = BoundingBox.union(sourceImageBounds);
        //Determine the bounds of the tile set in tile coordinates.
        long mincol = (long) Math.floor((tileSetBounds.minx + 180.0) / (360.0
/ Math.pow(2.0, (double) baseScale)));
        long maxcol = (long) Math.floor((tileSetBounds.maxx + 180.0) / (360.0
/ Math.pow(2.0, (double) baseScale)));
        long minrow = (long) Math.floor((tileSetBounds.miny + 90.0) / (180.0
/ Math.pow(2.0, (double) baseScale - 1)));
        long maxrow = (long) Math.floor((tileSetBounds.maxy + 90.0) / (180.0
/ Math.pow(2.0, (double) baseScale - 1)));

//Iterate over the tile set coordinates.
        for (long c = mincol; c <= maxcol; c++) {
            for (long r = minrow; r <= maxrow; r++) {
                TileAddress address = new TileAddress(r, c, baseScale);
                //Compute the geographic bounds of the specific tile.
                BoundingBox tileBounds = address.getBoundingBox();
                //Iterate over the source images.
                BufferedImage tileImage = new BufferedImage(TILE_SIZE,
TILE_SIZE, BufferedImage.TYPE_INT_ARGB);
                for (int i = 0; i < sourceImages.length; i++) {
                    //Determine if the specific source image intersects the
tile being created.
                    if (sourceImages[i].bb.intersects(tileBounds.minx,
tileBounds.miny, tileBounds.maxx, tileBounds.maxy)) {
                        //Check the cache for the source image.
                        BufferedImage bi =
cache.getSourceImageData(sourceImages[i].name);
                        if (bi == null) {
                            //If it is not in the cache load it from disk and
save in the cache.
                            bi = readImage(sourceImages[i].name);
                            cache.putSourceImageData(sourceImages[i].name,
bi);
                        }
```

FIG. 13B-1

```
                        //Extract the required image data from the source
image and store it in the tiled image.
                        drawImageToImage(bi, sourceImages[i].bb, tileImage,
tileBounds);
                }
            }
            //Save the completed tiled image to the tile storage
mechanism.
            tileOutputStream.writeTile(address, tileImage);
        }
    }
}
```

FIG. 13B-2

```
    public void createScaledTile(TileInputStream tileInputStream,
TileOutputStream tileOutputStream, int baseScale, long minCol, long maxCol,
                  long minRow, long maxRow) {
      //For each scale from base scale - 1 to 1, do the following.
      for (int scale = baseScale - 1; scale <= 1; scale--) {
         //Determine the bounds of the current tile scale in tile
coordinates.
         //ratio will be used to reduce the original tile set bounding
coordinates to those applicable for each successive scale.
         int ratio = (int) Math.pow(2, baseScale - scale);
         long curMinCol = (long) Math.floor(minCol / ratio);
         long curMaxCol = (long) Math.floor(maxCol / ratio);
         long curMinRow = (long) Math.floor(minRow / ratio);
         long curMaxRow = (long) Math.floor(maxRow / ratio);
         //Iterate over the tile set coordinates.
         for (long c = curMinCol; c <= curMaxCol; c++) {
            for (long r = curMinRow; r <= curMaxRow; r++) {
               //For each tile, do the following:
               TileAddress address = new TileAddress(r, c, scale);
               //Determine the FOUR tiles from the higher scale that
contribute to the current tile.
               TileAddress tile00 = new TileAddress(r * 2, c * 2, scale
+ 1);
               TileAddress tile01 = new TileAddress(r * 2, c * 2, scale
+ 1);
               TileAddress tile10 = new TileAddress(r * 2, c * 2, scale
+ 1);
               TileAddress tile11 = new TileAddress(r * 2, c * 2, scale
+ 1);
               //Retrieve the four tile images, or as many as exist.
               BufferedImage image00 = tileInputStream.getTile(tile00);
               BufferedImage image01 = tileInputStream.getTile(tile01);
               BufferedImage image10 = tileInputStream.getTile(tile10);
               BufferedImage image11 = tileInputStream.getTile(tile11);
               //Combine the four tile images into a single, scaled-down
image.

BufferedImage tileImage = new BufferedImage(TILE_SIZE,
TILE_SIZE, BufferedImage.TYPE_INT_ARGB);
               Graphics2D g = (Graphics2D) tileImage.getGraphics();
               g.setRenderingHint(RenderingHints.KEY_INTERPOLATION,
RenderingHints.VALUE_INTERPOLATION_BILINEAR);
               boolean hadImage = false;
```

FIG. 14-1

```
            if ((image00 != null)) {
                g.drawImage(image00, 0, Constants.TILE_SIZE_HALF,
Constants.TILE_SIZE_HALF, Constants.TILE_SIZE, 0, 0, Constants.TILE_SIZE,
                        Constants.TILE_SIZE, null);
                hadImage = true;
            }
            if ((image10 != null)) {
                g.drawImage(image10, Constants.TILE_SIZE_HALF,
Constants.TILE_SIZE_HALF, Constants.TILE_SIZE, Constants.TILE_SIZE, 0, 0,
                        Constants.TILE_SIZE,Constants.TILE_SIZE,
null);
                hadImage = true;
            }
            if ((image01 != null)) {
                g.drawImage(image01, 0, 0, Constants.TILE_SIZE_HALF,
Constants.TILE_SIZE_HALF, 0, 0, Constants.TILE_SIZE,
                        Constants.TILE_SIZE, null);
                hadImage = true;
            }
            if ((image11 != null)) {
                g.drawImage(image11, Constants.TILE_SIZE_HALF, 0,
Constants.TILE_SIZE, Constants.TILE_SIZE_HALF, 0, 0, Constants.TILE_SIZE,
                        Constants.TILE_SIZE, null);
                hadImage = true;
            }
            //save the completed tiled image to the tile storage
mechanism.
            if (hadImage) {
                tileOutputStream.writeTile(address, tileImage);
            }
        }
    }
  }
}
```

77 — $N = \sum_{i=1}^{L} 2^i 2^{i-1}$

79 — $N = \sum_{i=1}^{L} 2^i 2^{i-2}$

| FILE ADDRESS (POSITION, SIZE) | FILE ADDRESS (POSITION, SIZE) | FILE ADDRESS (POSITION, SIZE) | FILE ADDRESS (POSITION, SIZE) | FILE ADDRESS (POSITION, SIZE) |
| --- | --- | --- | --- | --- |
| FILE ADDRESS (POSITION, SIZE) | FILE ADDRESS (POSITION, SIZE) | FILE ADDRESS (POSITION, SIZE) | FILE ADDRESS (POSITION, SIZE) | FILE ADDRESS (POSITION, SIZE) |
| FILE ADDRESS (POSITION, SIZE) | FILE ADDRESS (POSITION, SIZE) | FILE ADDRESS (POSITION, SIZE) | FILE ADDRESS (POSITION, SIZE) | FILE ADDRESS (POSITION, SIZE) |
| FILE ADDRESS (POSITION, SIZE) | FILE ADDRESS (POSITION, SIZE) | FILE ADDRESS (POSITION, SIZE) | FILE ADDRESS (POSITION, SIZE) | FILE ADDRESS (POSITION, SIZE) |

81 INDEX SECTION

FIG. 17B

| MAGIC NUMBER | TILE ADDRESS (SCALE, ROW, COLUMN) | TILE SIZE | TILE IMAGE (N BYTES) |
| --- | --- | --- | --- |
| MAGIC NUMBER | TILE ADDRESS (SCALE, ROW, COLUMN) | TILE SIZE | TILE IMAGE (N BYTES) |
| MAGIC NUMBER | TILE ADDRESS (SCALE, ROW, COLUMN) | TILE SIZE | TILE IMAGE (N BYTES) |
| MAGIC NUMBER | TILE ADDRESS (SCALE, ROW, COLUMN) | TILE SIZE | TILE IMAGE (N BYTES) |

83 TILE IMAGE SECTION

| MAGIC NUMBER | TILE ADDRESS (ROW, COLUMN) | TILE SIZE | TILE IMAGE (N BYTES) |
|---|---|---|---|
| MAGIC NUMBER | TILE ADDRESS (ROW, COLUMN) | TILE SIZE | TILE IMAGE (N BYTES) |
| MAGIC NUMBER | TILE ADDRESS (ROW, COLUMN) | TILE SIZE | TILE IMAGE (N BYTES) |
| MAGIC NUMBER | TILE ADDRESS (ROW, COLUMN) | TILE SIZE | TILE IMAGE (N BYTES) |

FIG. 19A

ROW INDEX FILE

| ROW 0 NULL |
| ROW 1 M |
| ROW 2 NULL |
| ROW 3 N |

TILE INDEX FILE

| | COLUMN 0 | COLUMN 1 | COLUMN 2 | COLUMN 3 | COLUMN 4 | COLUMN 5 | COLUMN 6 | COLUMN 7 |
|---|---|---|---|---|---|---|---|---|
| ROW 1 | FILE ADDRESS (POSITION, SIZE) | FILE ADDRESS (POSITION, SIZE) | NULL | NULL | NULL | FILE ADDRESS (POSITION, SIZE) | FILE ADDRESS (POSITION, SIZE) | FILE ADDRESS (POSITION, SIZE) |
| ROW 3 | FILE ADDRESS (POSITION, SIZE) | FILE ADDRESS (POSITION, SIZE) | NULL | NULL | NULL | FILE ADDRESS (POSITION, SIZE) | FILE ADDRESS (POSITION, SIZE) | FILE ADDRESS (POSITION, SIZE) |

FIG. 19B

```
public class IndexedTileOutputStream { static final long magicNumber = 0x772211ee;

String imagefilename;
    String rowindexname;
    String tileindexname;

RandomAccessFile imagefile;
    RandomAccessFile rowindex;
    RandomAccessFile tileindex;

long numrows, numcolumns;
    int rowRecordSize = 8;
    int tileRecordSize = 8 + 4;

public IndexTileOutputStream(String folder, String setname, int scale) {
        imagefilename = folder + "/" + setname + "-" + scale + ".tiles";
        rowindexname = folder + "/" + setname + "-" + scale + ".rowindex";
        tileindexname = folder + "/" + setname + "-" + scale + ".tileindex";
        numrows = TileStandards.zoomRows[scale];
        numcolumns = TileStandards.zoomColumns[scale];

try {
            imagefile = new RandomAccessFile(imagefilename, "rw");

//if the row file is empty, fill it with -1 to indicate empty values
            rowindex = new RandomAccessFile(rowindexname, "rw");
            if (rowindex.length() == 0) {
                rowindex.seek(0);
                for (int i = 0; i < numrows; i++) {
                    rowindex.writeLong(-1L);
                }
            }
            tileindex = new RandomAccessFile(tileindexname, "rw");
        } catch (Exception e) {
            e.printStackTrace();
        }
    }
```

FIG. 20A-1

```
    public void writeFile(long col, long row, byte[] data) { try {
            //position tile file to write at end of file
            long writepos = imagefile.length();
            imagefile.seek(writepos);

//write tile address and imagedata to file
            //write two magic numbers so that tile records can be
recovered in case of corrupted file
            imagefile.writeLong(magicNumber);
            imagefile.writeLong(magicNumber);
            imagefile.writeLong(col);
            imagefile.writeLong(row);
            imagefile.writeInt(data.length);
            imagefile.write(data);

//update index
            updateIndex(col, row, writepos, data.length);
        } catch (IOException e) {
            e.printStackTrace();
        }

} private void updateIndex(long col, long row, long writepos, int length) {
        try {
```

FIG. 20A-2

```
                //check if row is in the row index
                long rowposition = rowRecordSize * row;
                rowindex.seek(rowposition);
                long rowpointer = rowindex.readLong();
                if (rowpointer == -1L) {
                    //this means the row data is new and not already in the
index
                    rowpointer = tileindex.length();
                    tileindex.seek(rowpointer);
                    //write an array of empty values
                    for (int i = 0; i < numcolumns; i++) {
                        tileindex.writeLong(-1L);
                        tileindex.writeInt(-1);
                    }
                    //write the position back to the original row index
                    rowindex.seek(rowposition);
                    rowindex.writeLong(rowpointer);
                }
                //compute offset into row for specific col
                long offset = rowpointer + col * tileRecordSize;
                //position tile index for writing the file address of the
tile image
                tileindex.seek(offset);
                tileindex.writeLong(writepos);
                tileindex.writeInt(length);
            } catch (IOException e) {
                e.printStackTrace();
            }
        }
    } public void close() {
        try {
            imagefile.close();
            rowindex.close();
            tileindex.close();
        } catch (Exception e) {
        }
    }
}
```

FIG. 20B-1

```
%%%%%%%%%%%%%%%%%%%%%%%%%%%%%%%%%%%%%%%%%%%%%%%%%%%%%%%%%%%%
The algorithm for reading tiles is as follows:

Algorithm 6B: Java code for indexed file input public class IndexedFileInputStream {

String imagefilename;
        String rowindexname;
        String tileindexname;

RandomAccessFile imagefile;
        RandomAccessFile rowindex;
        RandomAccessFile tileindex;
```

FIG. 20B-2

```
        long numrows, numcolumns;
        int rowRecordSize = 8;
        int tileRecordSize = 8 + 4;

public IndexedTileInputStream(String folder, String setname, int
scale) {
            imagefilename = folder + "/" + setname + "-" + scale + ".tiles";
            rowindexname = folder + "/" + setname + "-" + scale +
".rowindex";
            tileindexname = folder + "/" + setname + "-" + scale +
".tileindex";
            numrows = TileStandards.zoomRows[scale];
            numcolumns = TileStandards.zoomColumns[scale];

try {
                imagefile = new RandomAccessFile(imagefilename, "rw");
                rowindex = new RandomAccessFile(rowindexname, "rw");
                tileindex = new RandomAccessFile(tileindexname, "rw");
            } catch (Exception e) {
                e.printStackTrace();
            }
        } public byte[] getTile(long col, long row) {
            try {
                //check if row is in the row index
                long rowposition = rowRecordSize * row;
                rowindex.seek(rowposition);
                long rowpointer = rowindex.readLong();
                if (rowpointer == -1L) {
                    //this means the row data is not in the index, and so the
tile doesn't exist
                    return null;
                }
                //compute offset into row for specific col
                long offset = rowpointer + col * tileRecordSize;
                //position tile index for reading the position and size of
the tile image
```

FIG. 20C-1

```
            tileindex.seek(offset);
            long tileposition = tileindex.readLong();
            int size = tileindex.readInt();
            if (tileposition == -1L) {
                //this means that the tile isn't there
                return null;
            }
            //adjust the tile position to skip the magic numbers and address information
            long adjustedTilePosition = tileposition + 8 + 8 + 8 + 8 + 4;
            byte[] data = new byte[size];
            //position the image file and read the image data
            imagefile.seek(adjustedTilePosition);
            imagefile.readFully(data);
            return data;
        } catch (IOException e) {
            e.printStackTrace();
        }
        return null;
```

FIG. 20C-2

SYSTEM AND METHOD FOR STORING A DATASET OF IMAGE TILES

CROSS-REFERENCE TO RELATED APPLICATIONS

This Application is a non-provisional application claiming priority to provisional application 61/551,112 filed on Oct. 25, 2011, under 35 USC 119(e). The entire disclosure of the provisional application is incorporated herein by reference.

BACKGROUND

Systems and methods disclosed herein relate generally to tile-based mapping systems. The first web-based mapping systems offered rudimentary mapping applications through a web browser. A first type of system allowed simple map movements by requiring a user to click on navigation arrow buttons surrounding the map view. When a user clicked on an arrow, the map moved a predetermined amount in the direction clicked. There were also buttons for zooming in and out. Other map applications allowed users to drag and draw boxes on the map to relocate the map view. These applications had several disadvantages, including slow rendering and downloading of map views, because the map view was often represented by a single large image file. Each time the map was moved to the left or right, the entire image was re-rendered and re-sent to the client even though only a portion of the image was new. However, the interfaces were well suited to early web browsers, the map interface could be written entirely in HTML or with minimal JavaScript, and since all navigations were fixed, map servers could cache rendered maps. A second type of system adopted a map view and navigation style similar to desktop GIS systems which used browser plug-in technology and development platforms like Java or Flash.

GOOGLE MAPS® introduced the "slippy map" interface that allows users to move and zoom the map, and was written in HTML and JavaScript. A key technology behind the "slippy map" interface was the concept of tile-based mapping. Mapping applications were made responsive by using background maps that had been broken into smaller tiled images. Those tiles were stored, already rendered, on a central server. Because they were already rendered, they could be sent to clients quickly. The tiles were discretely addressed so they could be cached by internet caching services and by clients' own browsers. The map images were broken into smaller pieces so that when users navigated the map view, only the new parts of the map had to be resent from the server.

Tile-based mapping systems are based on multiple discrete zoom levels, each corresponding to a fixed map scale. In tile-based mapping systems, multiple image tiles are used to virtualize a single map view, and image tiles are accessible using a discrete addressing scheme. Also, in tile-based mapping systems, tiled images stored on a server system are sent to a client system with minimal processing, i.e. as much processing is done ahead of time as possible. Optionally, although not required in tile-based mapping systems, tile addressing can follow a single global projection, tiles can be distributed using a client/server system architecture, and tiles can be organized into relatively few, fixed layers. Tile images can be of any size, and can vary from map scale to map scale, or can vary across the same scale or be random in size. What is needed is a system to determine which size is most efficient for a specific purpose.

Referring now to FIG. 1A (PRIOR ART), tiled image sets are created from collections of random source images that may have sizes and boundaries that follow no specific system. Collections of source images can take a variety of forms, for example, high resolution aerial imagery of the fifty largest cities, each represented by a small number (for example 5-50) of large source images (for example 10,000×10,000 pixels). Each of the source images can be a different size, cover a different portion of the earth, or have a different map resolution. Taken together, all the source images for all the cities form a single map layer. Each layer 12 of tile images has multiple scales or levels 14. Every tile set starts with a base scale 221 which is the scale with the highest number and highest resolution imagery. Each subsequent scale is a lower version of the scale preceding it. In the tile creation process, base scale 221 (the highest resolution scale) can be completed before lower resolution scales. Scales 14 include tiles 18 that are addressable by columns 423. Referring now to FIG. 1B (PRIOR ART), exemplary base scale (level 3) 28 is the highest resolution scale in the exemplary series including level one 24 and level two 26, the lowest resolution level (scale) in the series. What is needed is a multi-processor, memory efficient system to create tiled images from source images.

Tiled images are divided into scales, and each scale is divided into rows and columns. The general problem of tile storage is to link a tile's address (layer, scale, row, and column) to a binary block of data. Tiled images can be stored in computer files on a computer-readable medium in a separate file for each tiled image, bundled together into larger files, or database tables. Storing many hundreds or thousands of tiled images in a single file can provide efficiencies that may not be available for other storage means. If the tiled images are written sequentially to a file, retrieval of individual images can be problematic without a way of knowing which tile address corresponds to which tiled image. Tile addresses can be stored with each image in the file, but in order to access a specific tiled image, the whole file is scanned, which could be inefficient. What is needed is a system for organizing blocks of data into scales, rows, and columns so that tiled images can be efficiently written to and read from a computer-readable medium.

SUMMARY

The system and method of the present embodiment address the needs of determining which tile size is most efficient for a specific purpose, providing a multi-processor, memory efficient system to create tiled images, and providing a data organization scheme so that tiled images can be efficiently written to and read from a computer-readable medium.

A first method of the present embodiment for determining the tile size for a particular virtualized map view can include, but is not limited to including, the steps of generating a plurality of random map views for a randomly-selected scale, calculating a number of tiles needed to fill each of the random map views for a plurality of tile sizes, calculating a total number of tiles accessed, and a total number of bytes accessed based on the total number of tiles accessed, to fill each of the random map views for the plurality of tile sizes, and selecting an optimum tile size based on minimizing the total number of bytes accessed for the tile size. The step of selecting an optimum tile size can include, but is not limited to including, the step of minimizing a decompression time based on an image format associated with the each of the random map views.

A second method of the present embodiment for converting source image data to tile data can include, but is not limited to including, the steps of (a) selecting at least one source image set, (b) computing a scaling value for the at least one source image set, (c) selecting a base scale for a tile set to be created based on the scaling value, (d) establishing the tile set geographic bounds of the tile set, (e) converting the tile set geographic bounds, (f) for each source image from each of the at least one source image sets (i) determining source image geographic bounds of the source image, (ii) if there is an intersection between the source image geographic bounds and the tile set geographic bounds, (1) loading the source image from a LRU cache, if possible, (2) if the source image is not in the LRU cache, loading the source image into the LRU cache, (3) extracting image data from the source image at the intersection, (4) scaling the image data based on the base scale, (5) storing the scaled image data to a tile storage mechanism, (f) clearing the LRU cache, and (g) repeating steps (a) through (f) for each of the at least one source image sets.

A third method of the present embodiment for storing a dataset of image tiles can include, but is not limited to including, the steps of (a) determining a number of zoom levels, (b) accessing a plurality of cluster files including two top cluster files, the two top cluster files including a first subset of the zoom levels, (c) accessing the image tiles, each of the image tiles having a tile zoom level and a tile location, (d) for each of the image tiles, computing a cluster name based on the tile zoom level and the location, (e) for each of the image tiles, if a selected cluster file from the plurality of cluster files has a name that matches the computed cluster name, (i) computing an image tile pointer for the image tile associated with the computed cluster name, (ii) storing the image tile pointer in a fixed length index in the selected cluster file, and (iii) storing the image tile associated with the computed cluster name in the selected cluster file according to the image tile pointer, and (f) for each of the image tiles, if a selected cluster file from the plurality of cluster files has a name that does not match the computed cluster name, (i) determining an other subset of the zoom levels, the other subset not including the zoom levels of the first subset, (ii) creating a new cluster file as part of the plurality of cluster files, the new cluster file having a new cluster file index of fixed length, the fixed length based on the other subset of zoom levels, the new cluster file associated with the tile location, (iii) computing an image tile pointer for the image tile associated with the computed cluster name based on the tile zoom level and the tile location, (iv) storing the image tile pointer in the new cluster file index in the new cluster file, and (v) storing the image tile associated with the computed cluster name in the new cluster file according to the image tile pointer.

A fourth method of the present embodiment for storing and retrieving tiled image data can include, but is not limited to including, the steps of for each of a plurality of tiles at a pre-selected zoom level from the tiled image data, storing a tile record in a tiled image file, the tile record being associated with a row and a column, creating a lookup table having a direct-lookup value for the tiled record at the row and the column associated with the tiled image, when there are none of the tile records at the row and the column of the lookup table, storing a null value in the lookup table at the row and the column, when there are none of the tile records in a lookup table row in the lookup table, omit the lookup table row from the lookup table, creating a row index file having a null value for each of the omitted lookup table rows, and retrieving an address for a specific tile by executing the steps including, but not limited to seeking to a row position of the row associated with the tile record in the row index file, reading a row index value at the position, positioning the tile index file according to the row index value if the value is non-null, seeking to a column position for the column associated with the tile record, reading an address associated with the tile record, and retrieving the tile record at the address.

BRIEF DESCRIPTION OF THE DRAWINGS

FIG. 6 is a table relating image size to format overhead;

FIG. 8A is a software code listing for a random map center algorithm;

FIG. 8B is a software code listing for a random map view generator algorithm;

FIGS. 13A-1, 13A-2, 13B-1, 13B-2, 14-1, and 14-2 are exemplary software code and data type definitions for creating a base scale of a tile set and for creating lower resolution scales;

FIG. 17A illustrates equations for computing the number of tiles for a tile set with a specific number of layers, FIG. 17B is a table presenting the structure of the index file and the structure of the time image section;

FIG. 19A illustrates the structure of the tiled image file of the present embodiment;

FIG. 19B illustrates the structure of the tile index file and the structure of the row index file of the present embodiment;

FIGS. 20A-1, 20A-2, 20B-1, 20B-2, 20C-1, and 20C-2 are software code listing for tile output code and tile input code;

DETAILED DESCRIPTION

The problems set forth above as well as further and other problems are solved by the present teachings. These solutions and other advantages are achieved by the various embodiments of the teachings described herein below.

Figure 1A:
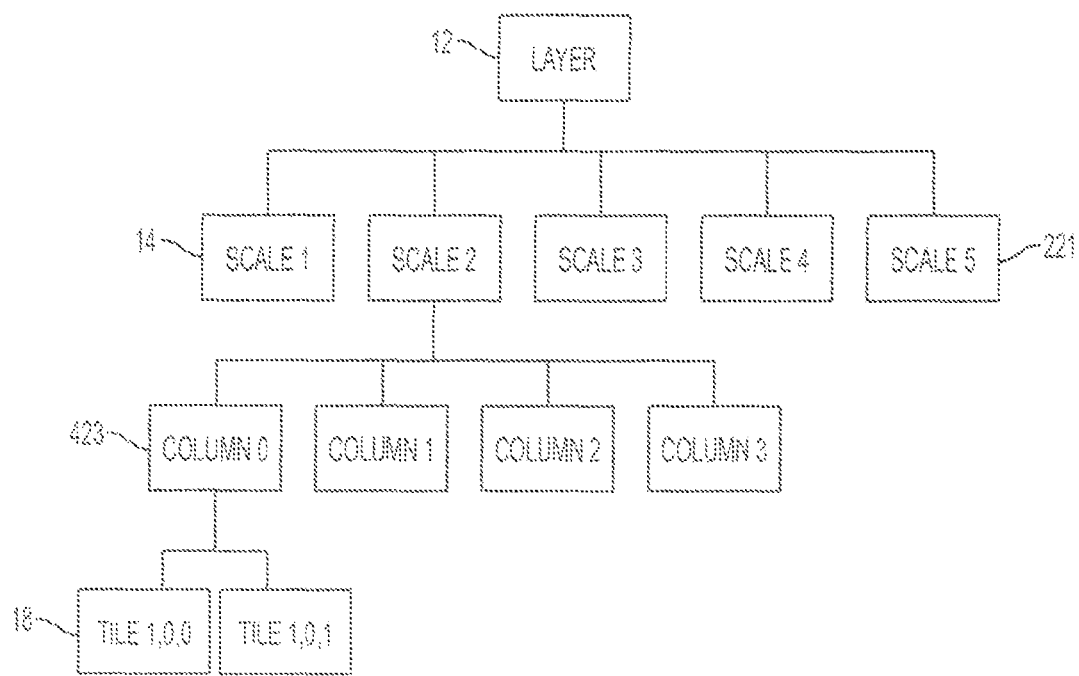
FIG. 1A PRIOR ART is a hierarchical block diagram of layers, scales, columns, and tiles.
Figure 1B:
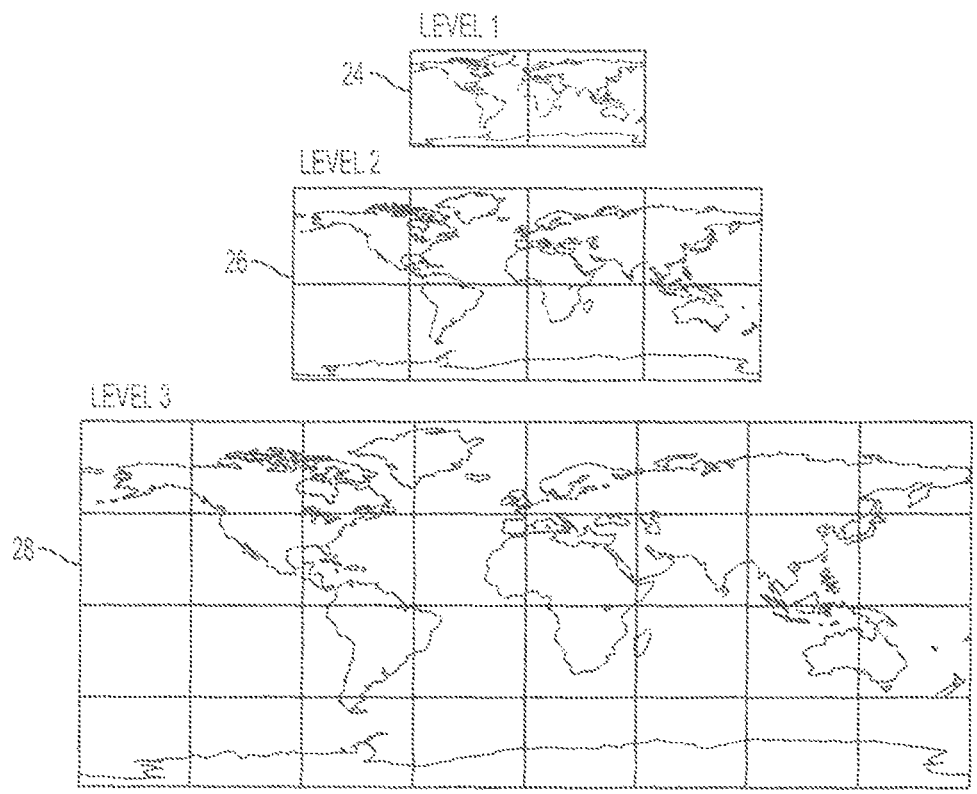
FIG. 1B PRIOR ART is a pictorial diagram of three zoom levels.
Figure 2:
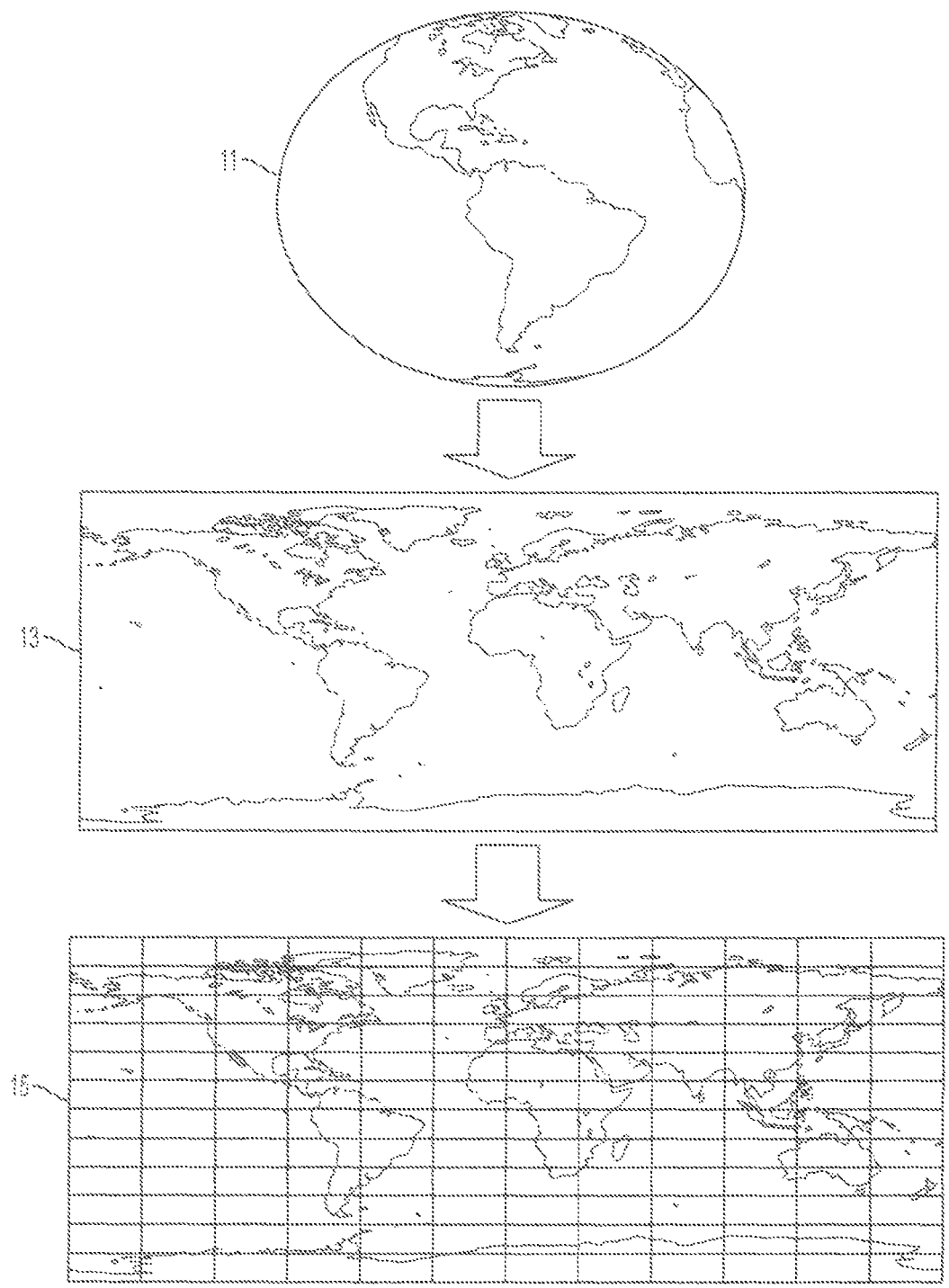
FIG. 2 is a pictorial diagram of the earth mapped to a two-dimensional surface, and with a grid overlain upon the surface.

Referring now to FIG. 2, tile-based mapping systems map positions on the earth 11 to a two-dimensional surface 13 and divide that surface into a series of regularly spaced grids 15. Map tiles are discretely addressed, and a translation method between tile addresses and a continuous geospatial coordinate system is defined. This logical tile scheme forms a multi-resolution, regularly spaced grid that is tied to a single two-dimensional map projection which allows a tiled image to be accessed directly with discrete coordinates. For example, instead of requesting a map image with a bounding rectangle delineated with continuous real numbers like [−100.0, 30.00] to [−80.0, 40.0], a tile can be requested from a grid with zoom level, column, and row addresses delineated with discrete integer values.

Figures 3A, 3B:
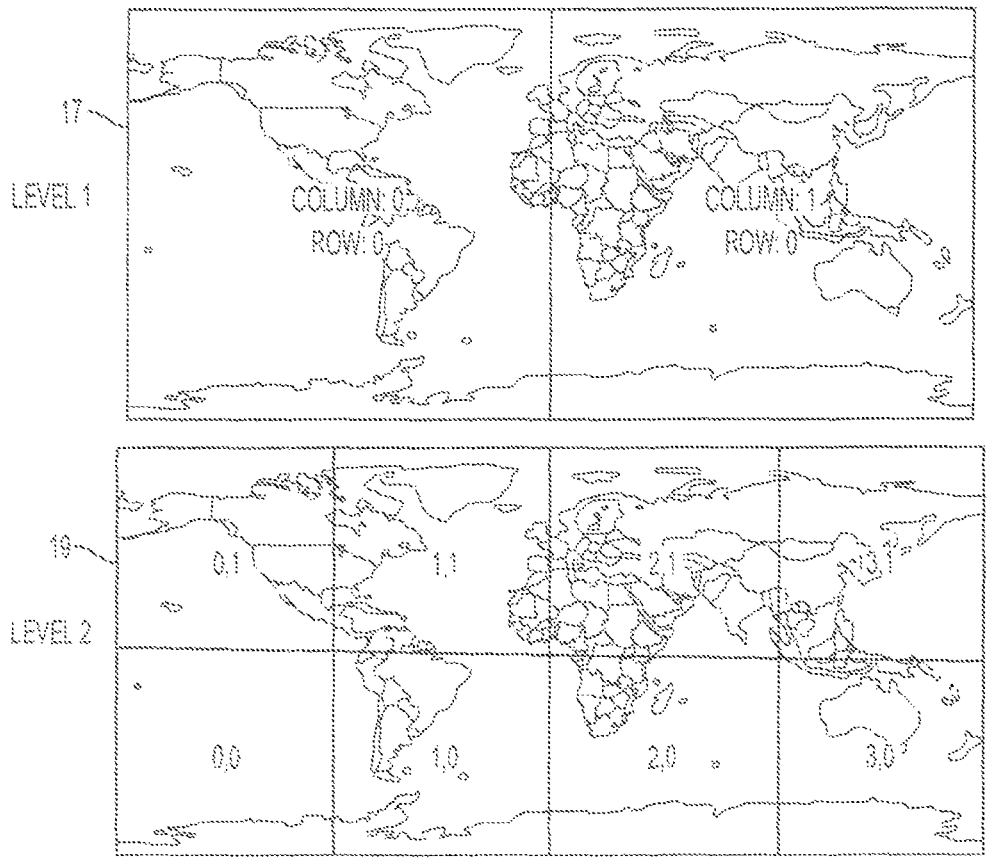
FIG. 3A is a pictorial diagram of a geodetic projection overlain with a tile scheme.
FIG. 3B illustrates equations that relate a tile address to a geographic bounding rectangle.

Referring now to FIG. 3A, there is a mapping between the address of a tile to the geospatial coordinates for the area covered by the tile. One possible way to do this, for example, is to start with a geodetic projection which portrays the earth as a rectangle 360° wide and 180° tall. In this case, the base projection and the logical tile scheme have 2-to-1 aspect ratios. At zoom level one 17, the logical tile scheme has one row and two columns. Each subsequent zoom level, for example, zoom level two 19, has double the number of rows and columns and four times the number of tiles as the previous zoom level. At each increase in zoom level, each tile is divided into four sub-tiles. Although there is no theoretical maximum number of zoom levels, the practical limit is twenty. The number of columns for a zoom level i is $2^i$ and the number of rows is $2^{i-1}$. Referring now to FIG. 3B, the tile address can be related to a geographic bounding rectangle as per equations 21 and 23.

Figures 4A, 4B:
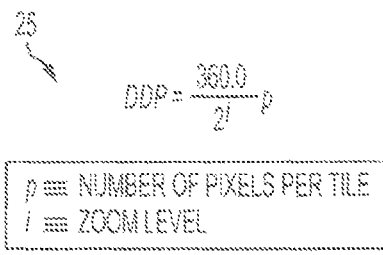
FIG. 4A illustrates an equation to compute dots per pixel.
FIG. 4B is a table relating zoom levels to a number of tiles and dots per pixel.

Referring now to FIG. 4A, before a tile set can be created from a set of random source images, the base scale or a target base scale can be chosen to substantially match the resolution of the source images because a given set of random source images may not match exactly one of the predetermined scale resolutions. Degrees per pixel (DPP) 25 can be used to choose base scales for sets of source images. Information about the sources images, such as image width and height in pixels, and minimum and maximum vertical and horizontal coordinates in degree, are used in the present embodiment to convert the source image to a tile set. DPP 25 can be computed by combining the vertical and horizontal dimensions of the image when tiled image projections preserve the same DPP in each dimension as the logical tile scheme and when the calculations are performed in degrees. Referring now to FIG. 4B, zoom levels (scales) 309 in an example logical tile scheme with 512×512 pixel tiles are shown. Source images stored in other projections might use meters for the coordinate system, requiring a conversion to degrees. For example, is a set of source images has a DPP of 0.03, this falls between scales 4 and 5. If scale 4 is chosen, the sources images will be scaled down and data will be lost. If scale 5 is chosen, the source images will be scaled up, preserving all data, but requiring more storage space. As an example, if the source image set is 10 million bytes uncompressed and has a DPP value of 0.03, when converted to scale 4, the source image will be 4.66 million bytes, and when converted to scale 5 will be 18.645 million bytes. After the tiled images for the base scale have been created, the lower resolution scale tiled images can be created.

When a user moves a map, a tiled mapping client can calculate which tiles are necessary to fill the map, can fetch the tiles, and can stitch the tiles together on the map. A map is defined by both geographic area and pixel area. To calculate which tiles to retrieve, if the client supports only discrete map scales, the client need only know the current zoom level, the tile index of the origin of the map, and the number of tiles required to fill the map. To provide the tiles, however, source images must be converted to tiles, and for this, a determination of the most efficient tile size is needed.

Each raster image is a grid of pixels, and each pixel represents the color of the image at a point in the image. Pixel values are expressed in units of the image's color space, or the abstract model that describes how color components can be represented, e.g. the RGB (red-green-blue) model requires that color components for red, green, and blue be stored as separate values for each pixel. The RGB components are usually stored as single byte values, i.e. integer values from 0 to 255, in a 4-byte integer word. Raster image pixels are addressable using two-dimensional coordinates with an orthogonal coordinate system over the image. Cartesian coordinates can be used for a mapping coordinate system, where the center of the coordinate space is (0,0). Raster images can be stored in formats that can be distinguished by how they handle compression issues, for example, JPEG (lossy compression), PNG (lossless compression), and BMP, PPM, PGM, and PBM (no compression). There are also file formats that have been adapted for storing geospatial images, for example, MrSID (LIZARDTECH®), JPEG2000, and GEO-TIFF. Source images can be scaled because tiled images are stored in fixed resolutions that are unlikely to match source image resolutions. Image scaling is a type of interpolation for which there are common algorithms such as, for example, but not limited to, nearest neighbor, bilinear, and bicubic.

Figure 5:
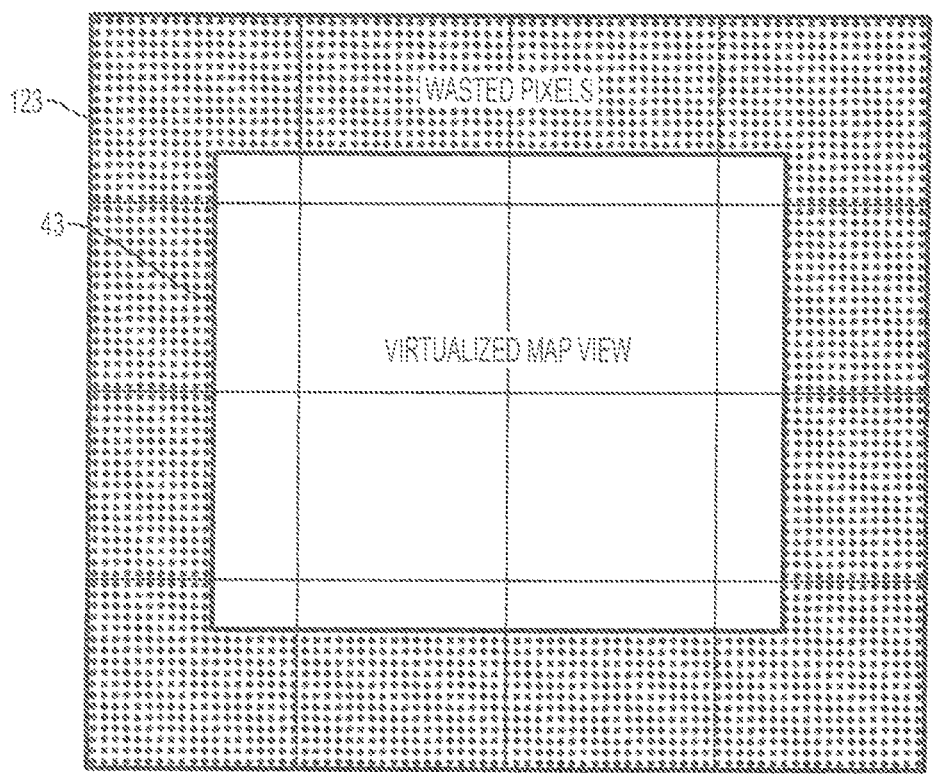
FIG. 5 is a schematic diagram of a virtualized map view and wasted pixels.

Referring now to FIGS. 5 and 6, each image has overhead including the overhead of multiple seeks and reads from a file system, uneven utilization of the file system's native block size, and the header and other overhead storage space within each image file. Common image formats such as PEG and PNG contain header information and image metadata, and "wasted pixels" 123 (FIG. 5), pixels that are transmitted but are not part of the map view 43 (FIG. 5). For a particular image size 11 (FIG. 6), JPEG format contains JPEG bytes 33 (FIG. 6) and JPEG overhead percentage 37 (FIG. 6). Likewise, for a particular image size 11, PNG contains PNG bytes 35 (FIG. 6) and PGN overhead percentage 39 (FIG. 6). Clearly, lossy JPEG compression leads to a higher relative overhead than lossless PNG compression. Using images that are large enough to reduce image overhead, but not so large as to consume too much memory, or require too much time to load the image, can provide optimum response time. A goal can be to minimize the number of individual images required to virtualize the map view and at the same time minimize the number of wasted pixels 123 (FIG. 5).

Figure 7A:
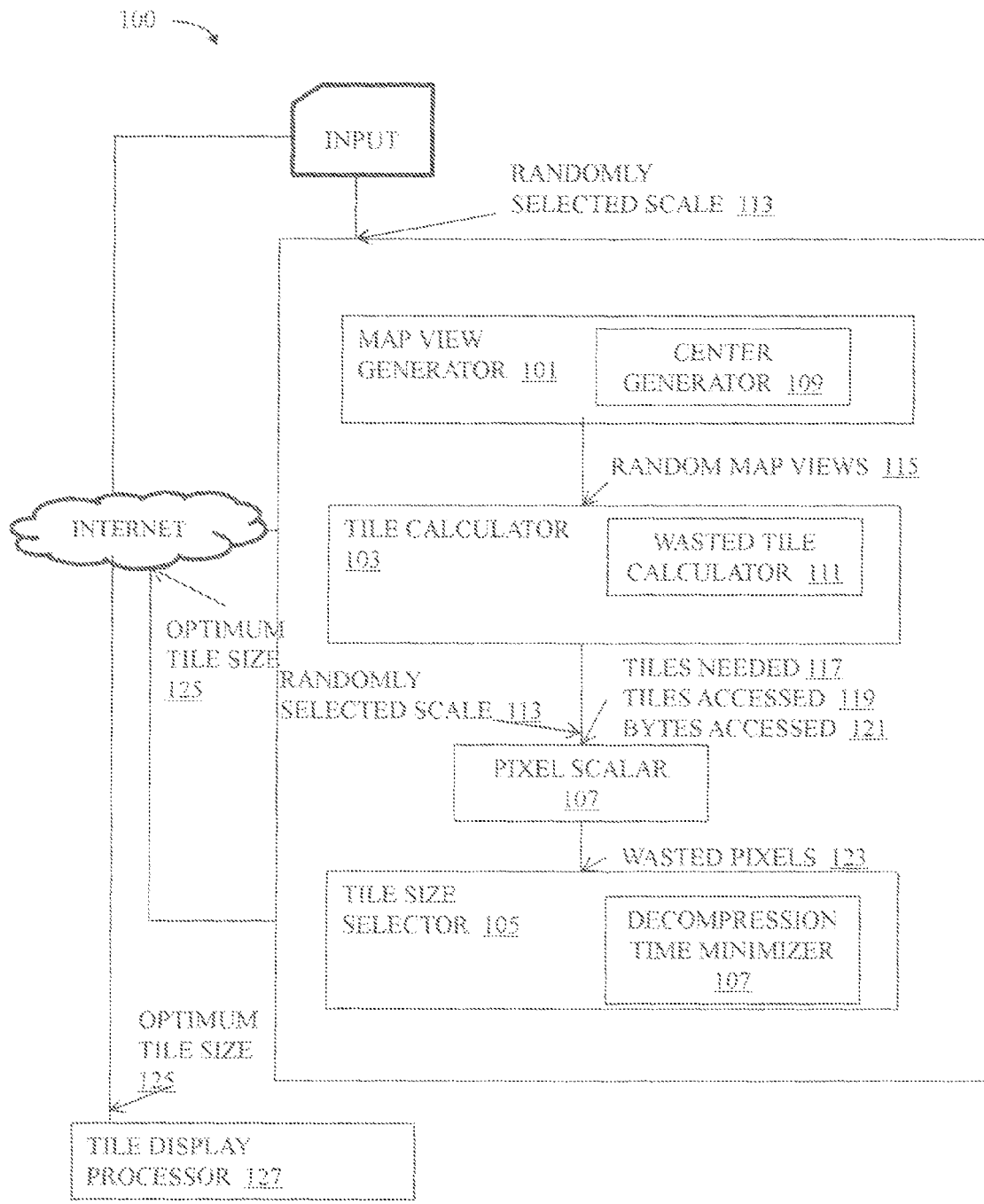
FIG. 7A is a schematic block diagram of the system of the present embodiment for determining tile size.

Referring now primarily to FIG. 7A, system 100 of the present embodiment for determining the tile size for a particular virtualized map view can include, but is not limited to including, map view generator 101 generating a plurality of random map views for a randomly-selected scale, tile calculator 103 calculating a number of tiles needed to fill each of the random map views for a plurality of tile sizes, a total number of tiles accessed 119 (FIG. 9A), and a total number of bytes accessed based on the total number of tiles accessed, to fill each of the random map views for the plurality of tile sizes, and tile size selector 105 selecting an optimum tile size based on minimizing the total number of bytes accessed for the tile size. Tile size selector 105 can optionally minimize a decompression time based on an image format associated with the each of the random map views. Optionally, system 100 can include, but is not limited to including, pixel scalar 107 scaling pixels in each of the tiles to match the randomly selected scale, calculating a wasted pixel number 123 (FIG. 9A) of scaled pixels from the tiles that are partially outside the random map views for each of a plurality of preselected tile sizes, and selecting the optimum tile size based on minimizing the wasted pixel number 123. Map view generator 101 can include, but is not limited to including, center generator 109 generating random center locations, and for each of the plurality of tile sizes, generating a map view by starting at a center location and extrapolating to a 2-d map view. Center generator 109 can further optionally select the center locations from −180 to +180 longitude and −90 to +90 latitude. Tile calculator 103 can include, but is not limited to including, wasted tile calculator computing wasted tiles as the tiles beyond earth boundaries of the random map views, and computing the total number of tiles accessed based on the wasted tiles.

Figure 7B:
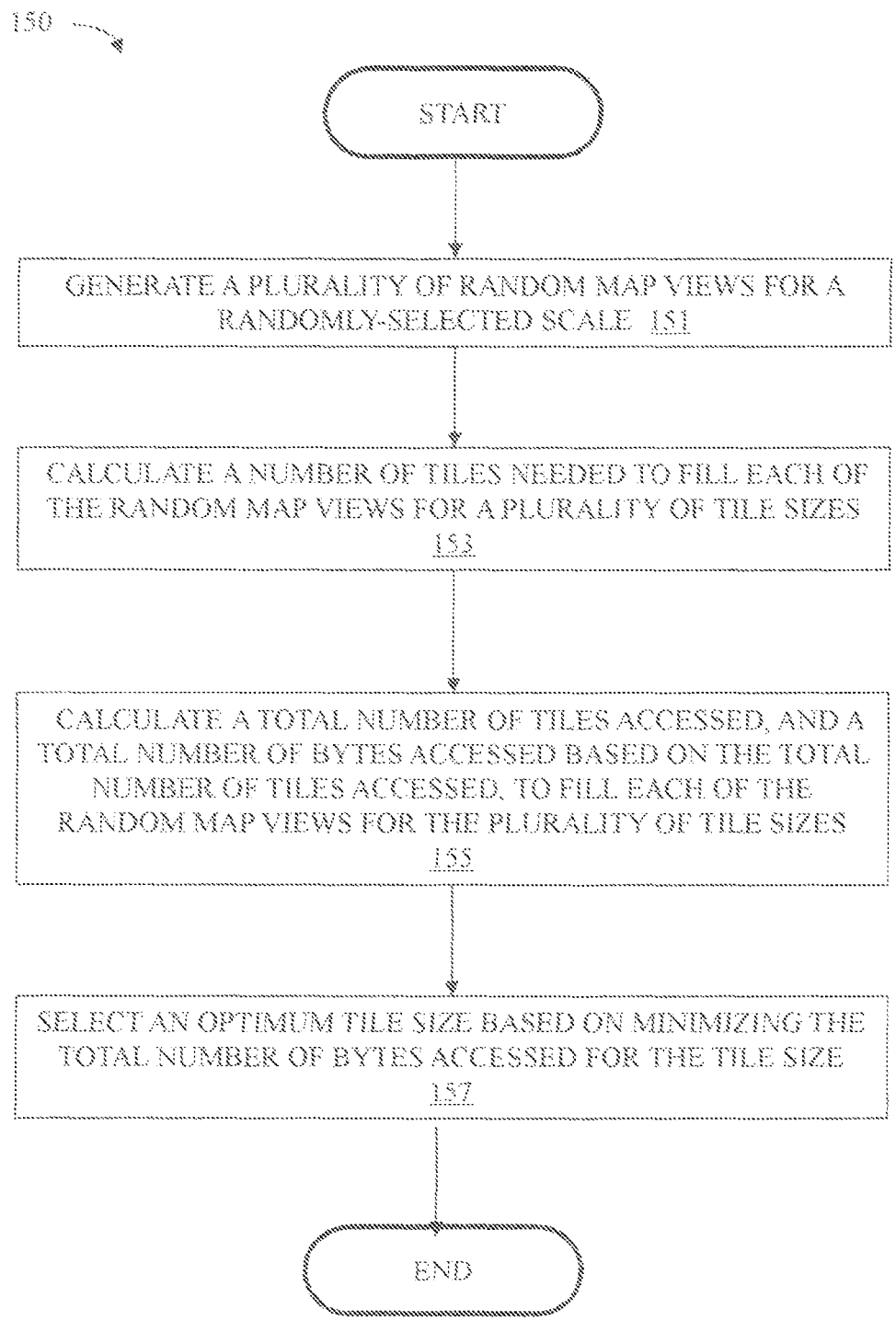
FIG. 7B is a flowchart of the method of the present embodiment for determining tile size.
Figures 9A, 9B:
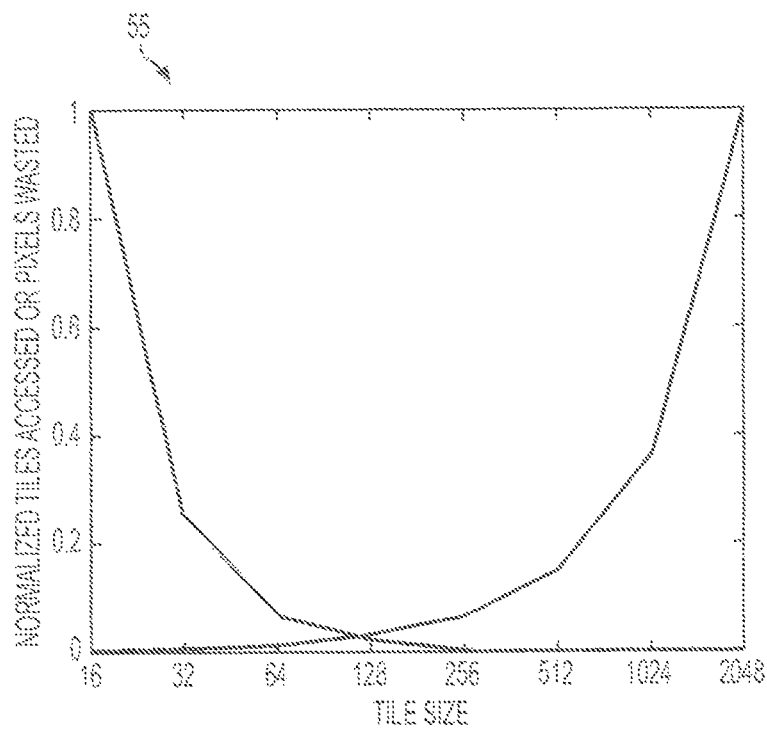
FIG. 9A is a table relating tile size to wasted pixels.
FIG. 9B is a graph of tile size versus wasted pixels for a 1024×768 map view.

Referring now primarily to FIG. 7B, method 150 of the present embodiment for determining the tile size for a particular virtualized map view can include, but is not limited to including, the steps of generating 151 a plurality of random map views for a randomly-selected scale, calculating 153 a number of tiles needed to fill each of the random map views for a plurality of tile sizes, calculating 155 a total number of tiles accessed 119 (FIG. 9A), and a total number of bytes accessed based on the total number of tiles accessed, to fill each of the random map views for the plurality of tile sizes, and selecting 157 an optimum tile size based on minimizing the total number of bytes accessed for the tile size. The step of selecting an optimum tile size can include, but is not limited to including, the step of minimizing a decompression time based on an image format associated with the each of the random map views. Optionally, method 150 can include, but is not limited to including, the steps of scaling pixels in each of the tiles to match the randomly selected scale, calculating a wasted pixel number 123 (FIG. 9A) of scaled pixels from the tiles that are partially outside the random map views for each of a plurality of preselected tile sizes, and selecting the optimum tile size based on minimizing wasted pixel number 123(FIG. 9A). The step of generating a plurality of random map views can include, but is not limited to including, the step of generating random center locations, and for each of the plurality of tile sizes, generating a map view by starting at a center location and extrapolating to a 2-d map view. Method 150 can further optionally include the step of selecting the center locations from −180° to +180° longitude and -90° to +90° latitude. The step of calculating a total number of tiles accessed can include, but is not limited to including, the steps of computing wasted tiles 123 (FIG. 9A) as the tiles beyond earth boundaries of the random map views, and computing the total number of tiles accessed 119 (FIG. 9A) based on the wasted tiles.

For example, for a map scale defined as having $2^{10}$ (1024) columns by 2 (512) rows, each tile is 1024/360:0 (2:84) degrees wide and long. Since all map views have the same aspect ratio, to generate random map views, a number of random center locations can be generated. For each tile size, the map view bounds can be extrapolated from the center location. In some cases, a portion of the map view might go beyond the normal bounds of the earth, for example, the longitude might be greater than 180° or less than −180°. In these cases, the randomization function can be constrained, or wasted pixels and tiles 123 can be computed as if they were legitimate pixels and tiles. In the latter case, the "wasted pixels" 123 can be used to perform wrapping in the boundary areas.

Referring now primarily to FIG. 8A, random map center algorithm 45 can generate 10,000 randomized map center locations for scale 10 and tile dimensions of 16, 32, 64, 128, 256, 512, 1024, and 2048. Random map center algorithm 45 can compute the total number of tiles accessed 119 (FIG. 9A) and the wasted pixels 123 (FIG. 9A) for each access. Referring now to FIG. 8B, random map view generator algorithm 47 is an example of how to randomly generate full map views by choosing a single x,y point and extrapolating to a two dimensional map view. Referring now to FIG. 9A, results are shown in the form of tiles accessed 119 and wasted pixels 123 for a 1024×768 map view in which 10,000 random map views are averaged, for various tile sizes 49. Referring now to FIG. 9B, tile size versus tiles accessed graph 55 of the normalized number of tiles accessed 119 (FIG. 9A) and of pixels wasted 123 (FIG. 9A) is shown. As shown, 16×16 tiles require the most bytes to be read, but generate relatively few wasted pixels 123. Tile sizes 128, 256, and 512 are closest to optimum tile size 125 (FIG. 7A) for this example.

Figure 10A:
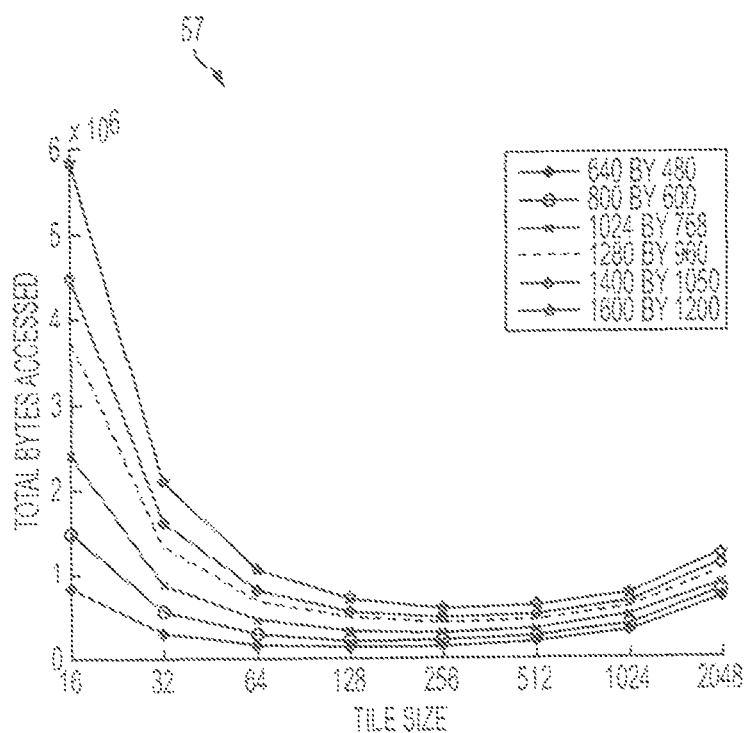
FIG. 10A is a graph of tile size versus bytes accessed for several different map view sizes.
Figure 10B:
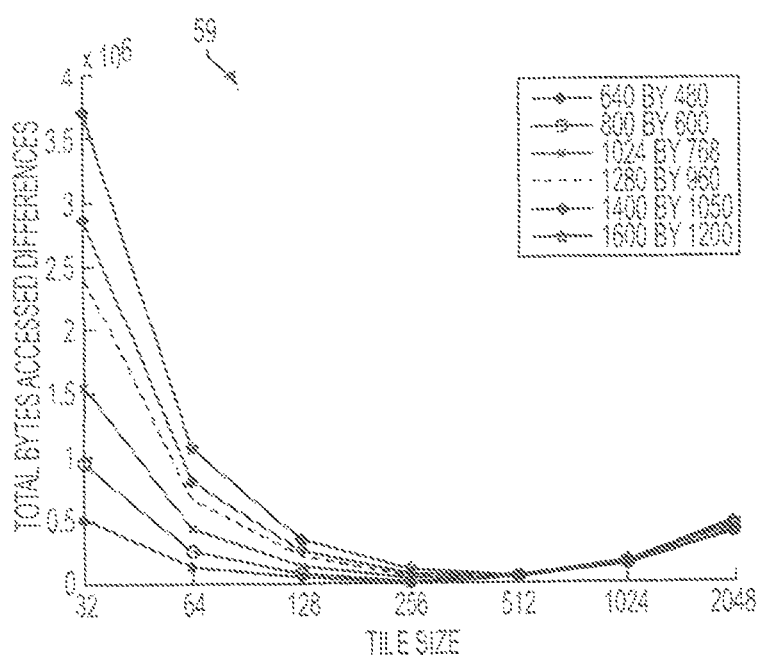
FIG. 10B is a graph of tile size versus tiles accessed for several different map views sizes.

Referring now primarily to FIG. 10A, tile size versus bytes accessed 121 (FIG. 7A) graph 57 for map resolutions 640×480, 800×600, 1024×768, 1280×960, 1400×1050, and 1600×1200 are shown. As shown, optimum tile sizes 125 (FIG. 7A) are 128, 256, and 512. Referring to FIG. 10B, JPEG bytes accessed versus differences from one tile size to another graph 59 is shown. The substantially flat line between tile size 256 and tile size 512 indicates that there is little difference between the total bytes accessed for tile sizes 256 and 512.

Figures 11A, 11B:
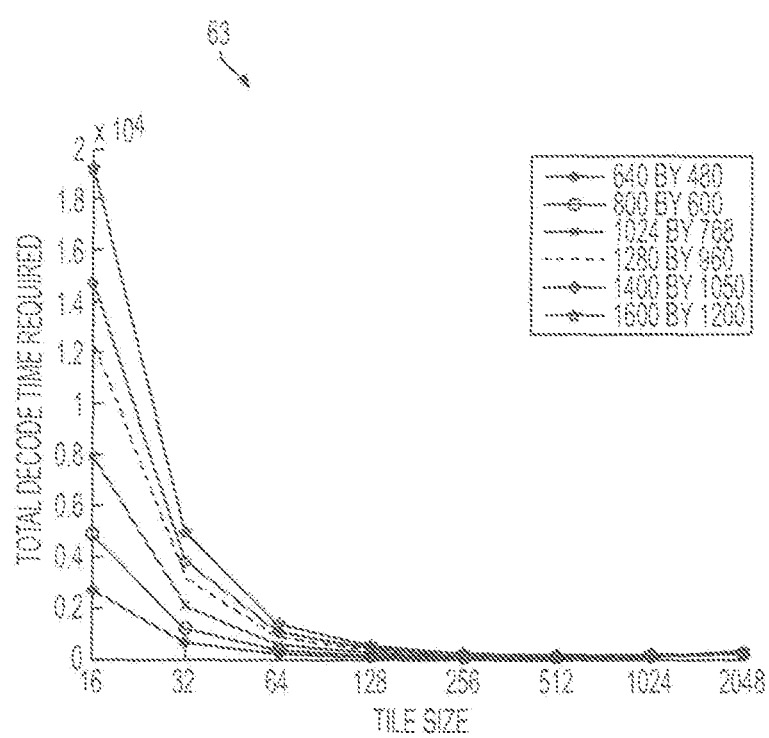
FIG. 11A is a table relating tile size to decode time for two commonly used formats.
FIG. 11B is a graph of tile size versus decode time.

Referring now to FIG. 11A, decode time table 61 presents the computation time required to decompress compress tiles images is shown as average decode times for tiles of varied sizes in both JPEG and PNG formats, and shown in FIG. 11B, tile size versus total decode time graph 63 shows a variety of map resolutions as above. The minimum computation time is shown to be for tile size 512. If, in these examples, the fixed map scale is replaced with a randomly selected map scale chosen from a continuous range instead of fixed discrete scales, the pixels can be scaled to match the scale of the map view with the randomly chosen scale.

Pull-based and push-based are iteration schemes available for creating tiles from random source images. In pull-based tile creation, tiles are iterated over and source image data are pulled from source images for each tile. In push-based tile creation, source images are iterated over and source image data are pushed from each source image to image tiles. To reduce the amount of memory needed for creating tiles, the pull-based scheme with a memory cache of source images can be used. In particular, in the present embodiment, a least recently used (LRU) cache of decoded source images is constructed in memory. If an element is added to an already-full cache, the least recently used element will be discarded. Each time a source image is accessed, the system of the present embodiment checks the LRU cache first for the source image, and only if the source image is not in the LRU cache is it read, decoded, and placed in the LRU cache. Tiles can be iterated over in geographic order. Since source images affect groups of tiles that border each other geographically, a substantial percentage of the source image accesses could be from the LRU cache.

Figure 12A:
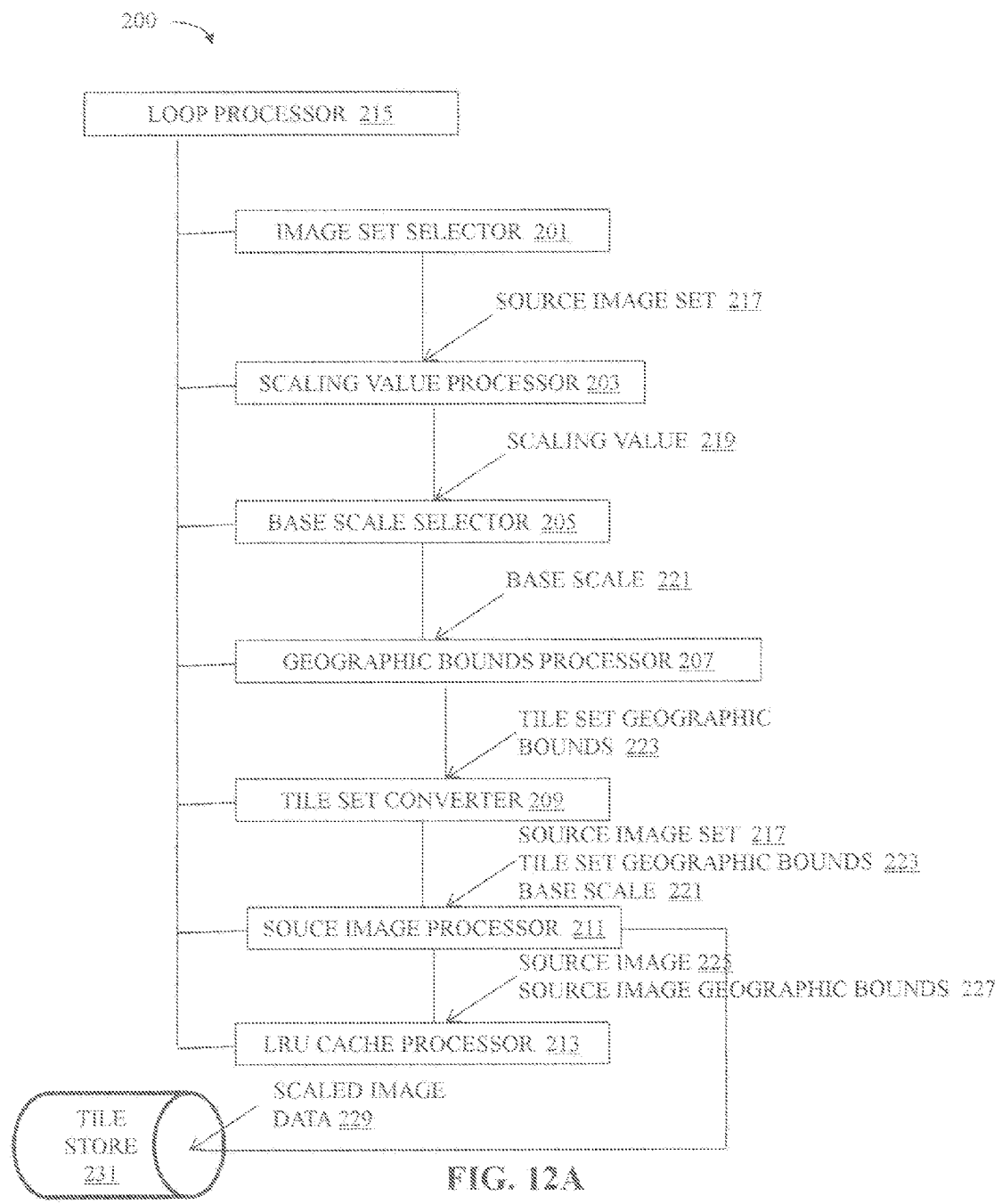
FIG. 12A is a schematic block diagram of the system of the present embodiment for converting source image data to tile data.

Referring now to FIG. 12A, system 200 for converting source image data to tile data can include, but is not limited to including, image set selector 201 selecting at least one source image set 217, scaling value processor 203 computing a scaling value 219 for the at least one source image set 217, base scale selector 205 selecting a base scale 221 for a tile set to be created based on scaling value 219, geographic bounds processor 207 establishing tile set geographic bounds 223 of the tile set, tile set converter 209 converting tile set geographic bounds 223, and source image processor 211 performing the following steps for each source image 225 from each of the at least one source image sets 217: (i) determining source image geographic bounds 227 of source image 225, (ii) if there is an intersection between the source image geographic bounds 227 and tile set geographic bounds 223, (1) loading source image 225 from a LRU cache, if possible, (2) if source image 225 is not in the LRU cache, loading source image 225 into the LRU cache, (3) extracting image data from source image 225 at the intersection, (4) scaling the image data based on base scale 221, (5) storing scaled image data 229 to tile storage mechanism 231. System 200 also includes LRU cache processor clearing the LRU cache, and loop processor 215 activating each element of system 200 for each of the at least one source image sets 217. Base scale selector 205 can choose base scale 221 to substantially match the resolution of source IMAGE 225. System 200 can optionally include a source image accessor accessing an image width in pixels of source image 225, an image height in pixels of source image 225, and the minimum and maximum vertical and horizontal coordinates in degrees of source image 225. Tile set geographic bounds 223 can be based on source image geographic bounds 227. System 200 can optionally include a memory cache caching tile sets in memory to improve performance. Source image accessor 217 can partially read source images 225. System 200 can optionally include a tile creation algorithm processor multi-threading the tile creation algorithms and using tile creation algorithms for distributed computing. System 200 can optionally include a partial update processor partially updating existing tiled image sets.

Figure 12B:
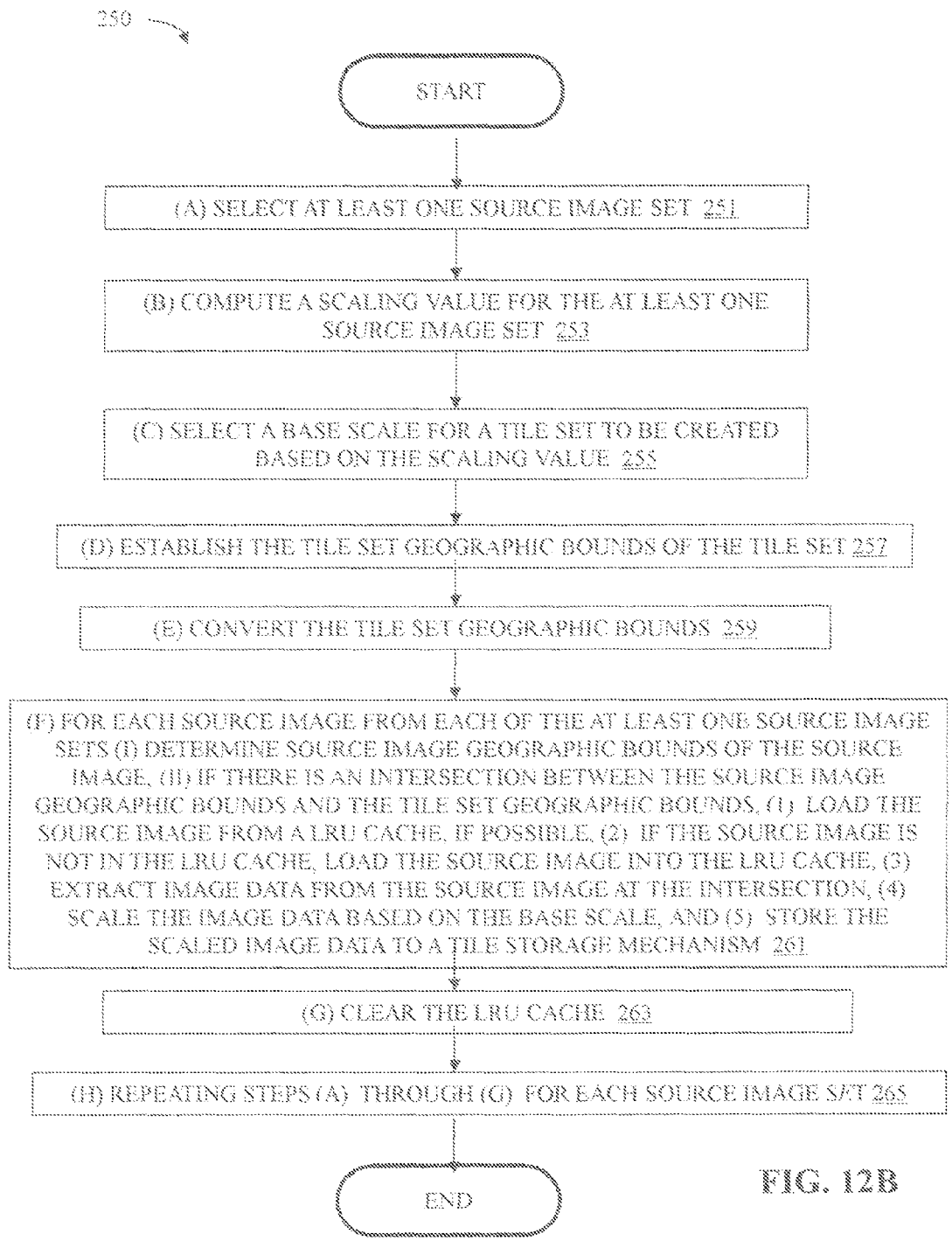
FIG. 12B is a flowchart of the method of the present embodiment for converting source image data to tile data.

Referring now to FIG. 12B, method 250 for converting source image data to tile data can include, but is not limited to including, the steps of (a) selecting 251 at least one source image set, (b) computing 253 a scaling value for the at least one source image set, (c) selecting 255 a base scale for a tile set to be created based on the scaling value, (d) establishing 257 the tile set geographic bounds of the tile set, (e) converting 259 the tile set geographic bounds, (0 for each 261 source image from each of the at least one source image sets (i) determining source image geographic bounds of the source image, (ii) if there is an intersection between the source image geographic bounds and the tile set geographic bounds, (1) loading the source image from a LRU cache, if possible, (2) if the source image is not in the LRU cache, loading the source image into the LRU cache, (3) extracting image data from the source image at the intersection, (4) scaling the image data based on the base scale, (5) storing the scaled image data to a tile storage mechanism, (g) clearing 263 the LRU cache, and (h) repeating 265 steps (a) through (g) for each of the at least one source image sets. The step of selecting a base scale can include, but is not limited to including, the step of choosing the base scale to substantially match the resolution of the source data. Method 250 can further include the steps of accessing an image width in pixels of the source image, an image height in pixels of the source image, and the minimum and maximum vertical and horizontal coordinates in degrees of the source image. The tile set geographic bounds can be based on the source image geographic bounds. Method 250 can include, but is not limited to including, the steps of caching tile sets in memory to improve performance, partially reading the source images, multi-threading the tile creation algorithms, using tile creation algorithms for distributed computing, and partially updating existing tiled image sets.

Referring now to FIGS. 13A-1, 13A-2, 13B-1, 13B-2, 14-1, and 14-2, exemplary and data type definitions 65 and tile set creation code 67 and lower resolution scales creation code 69 for executing the steps of method 250 (FIG. 13B) are shown. TileAddress.getBoundingBox( ) provides the bounding coordinates in degrees for an image tile address. "BoundingBox.intersects( ) tests if two bounding boxes intersect each other. BoundingBox.union( ) is used to combine multiple bounding boxes into a single one. The abstract method writeTile is used to provide a generic means for storing tiles. Additional abstract methods getSourceImageData and putSourceImageData are used to provide access to the LRU source image cache. The constant TILE_SIZE represents the width and height of the tiled images, and is the name for the horizontal and vertical dimensions. Exemplary tile set creation Java code 67 is shown for creating a base scale of a tile set (single-threaded) (FIG. 13A) and exemplary lower resolution scales creation Java code 69 (FIG. 14). Lower resolution scales can be constructed directly and exactly from four tiles from the previous scale as follows. For each scale from a based scale −1 to 1, (1) determine the bounds of the current tile scale in tile coordinates, (2) initialize the tile storage mechanism, (3) iterate over the tile set coordinates, i.e. for each tile (a) determine the four tiles from the higher scale that contribute to the current tile, (b) retrieve the four tile images, or as many as exist, (c) combine the four tile images into a single, scaled-down image, (d) save the completed tiled image to the tile storage mechanism, and (e) finalize the tile storage mechanism. To implement the previous set of steps, the types defined in the previous section can be used, as well as abstract class TileInputStream {abstract BufferedImage getTile{TileAddress address};} This type can allow reading of the tiles from previous scales, assuming that TileInputStream and TileOutputStream are linked somehow to allow writing tiles in one stage and reading them in another stage. For example, when creating scale 7, scale 7 tiles can be written to TileOutputStream, and then read when scale 6 is created.

Because reading from and writing to disk can be time-consuming steps in the tile creation process, following are optional optimizations that can minimize both of these. For example, if there is enough memory to store a significant subset of the tiled images, the source images can be looped through, read only once each, and the data from the source images can be applied to the tiled images. When all source images have been read, the tiled images can be stored in memory so that they may be accessed when creating the lower resolution scales. If there is not enough memory to hold the complete tile set uncompressed, the tile sets can be subdivided into, for example, but not limited to, geographic areas. Memory-based tile creation can include, but is not limited to including, the steps of (1) choosing a base scale for the tile set, (2) deterring the geographic bounds of the tile set (this can be based on the bounds of the source images), (3) determining the bounds of the tile set in tile coordinates, (4) initializing the tile cache, (5) iterating over the source images, for each source image (a) computing the bounds of the source image in tile coordinates, (b) reading the source image into memory, (c) iterating over the tile set coordinates, for each tile (i) computing the geographic bounds of the tile, (ii) checking the cache for the tile image, if it is not in the cache, creating an empty image and putting it in the cache, (iii) extracting the required image data from the source image and storing it in the tied image, (6) for each scale from base scale −1 to 1, (a) determining the bounds of the current tile scale in tile coordinates, (b) iterating over the tile set coordinates, for each tile (i) determining the four tiles from the higher scale that contribute to the current tile, (ii) retrieving the four tile images from the cache, or as many as exist, and (iii) combining the four tile images into a single, scaled-down image.

To organize blocks of data into scales, rows, and columns so that tiled images can be efficiently written to and read from disk, data are divided into clusters in which there are a fixed number of tiles. The clusters, in turn, are divided into multiple levels. Tiles are stored sequentially in a single file, but not in any particular order because they are indexed. The cluster in which a given tile should be placed can then be determined.

Figure 15A:
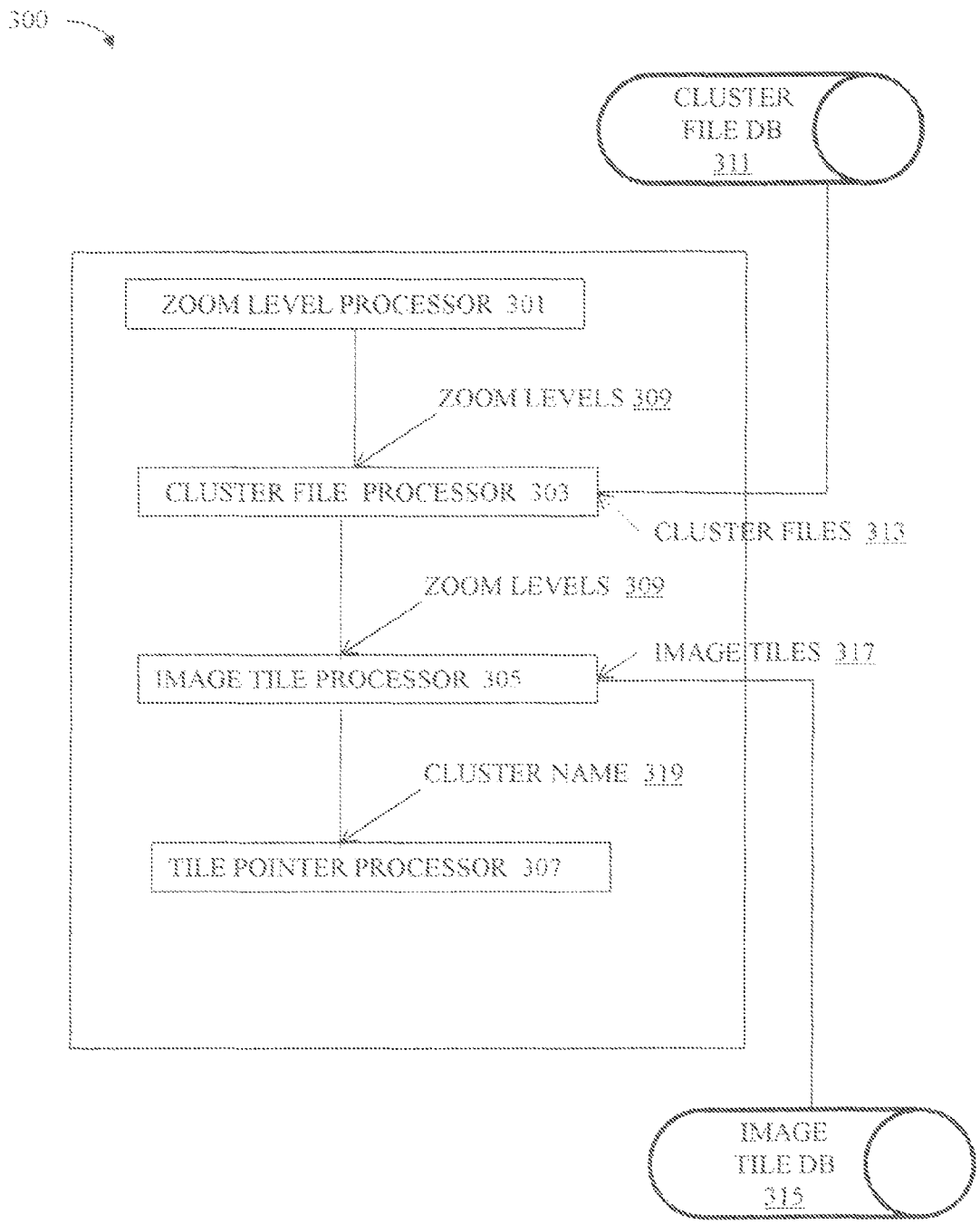
FIG. 15A is a schematic block diagram of the system of the present embodiment for storing image tiles.

Referring now to FIG. 15A, system 300 for storing a dataset of image tiles can include, but is not limited to including, zoom level processor 301 determining a number of zoom levels 309, cluster file processor 303 accessing a plurality of cluster files 313 including two top cluster files, the two top cluster files including a first subset of the zoom levels 309, image tile processor 305 accessing image tiles 317, each image tile 317 having a tile zoom level and a tile location. For each image tile 317, image tile processor 305 computes a cluster name 319 based on tile zoom level 309 and the tile location. For each image tile 317, if a selected cluster file 313 from the plurality of cluster files has a name that matches the computed cluster name, tile pointer processor 307 computes an image tile pointer for the image tile associated with the computed cluster name, stores the image tile pointer in a fixed length index in the selected cluster file, and stores the image tile associated with the computed cluster name in the selected cluster file according to the image tile pointer. For each of the image tiles, if a selected cluster file from the plurality of cluster files has a name that does not match the computed cluster name, zoom level processor 301 determines an other subset of the zoom levels, the other subset not including the zoom levels of the first subset, cluster file processor 303 creates a new cluster file as part of the plurality of cluster files, the new cluster file having a new cluster file index of fixed length, the fixed length based on the other subset of zoom levels, the new cluster file associated with the tile location, tile pointer processor computes an image tile pointer for the image tile associated with the computed cluster name based on the tile zoom level and the tile location, and stores the image tile pointer in the new cluster file index in the new cluster file, and image tile processor 305 stores the image tile associated with the computed cluster name in the new cluster file according to the image tile pointer. Zoom level processor 301 optionally determines a lowest zoom level in the other subset of zoom levels. Image tile processor 305 optionally copies each of the tile images at the lowest zoom level from each of the new cluster files, and stores each of the copied tiled images into the two top cluster files based on the tile location.

Figure 15B:
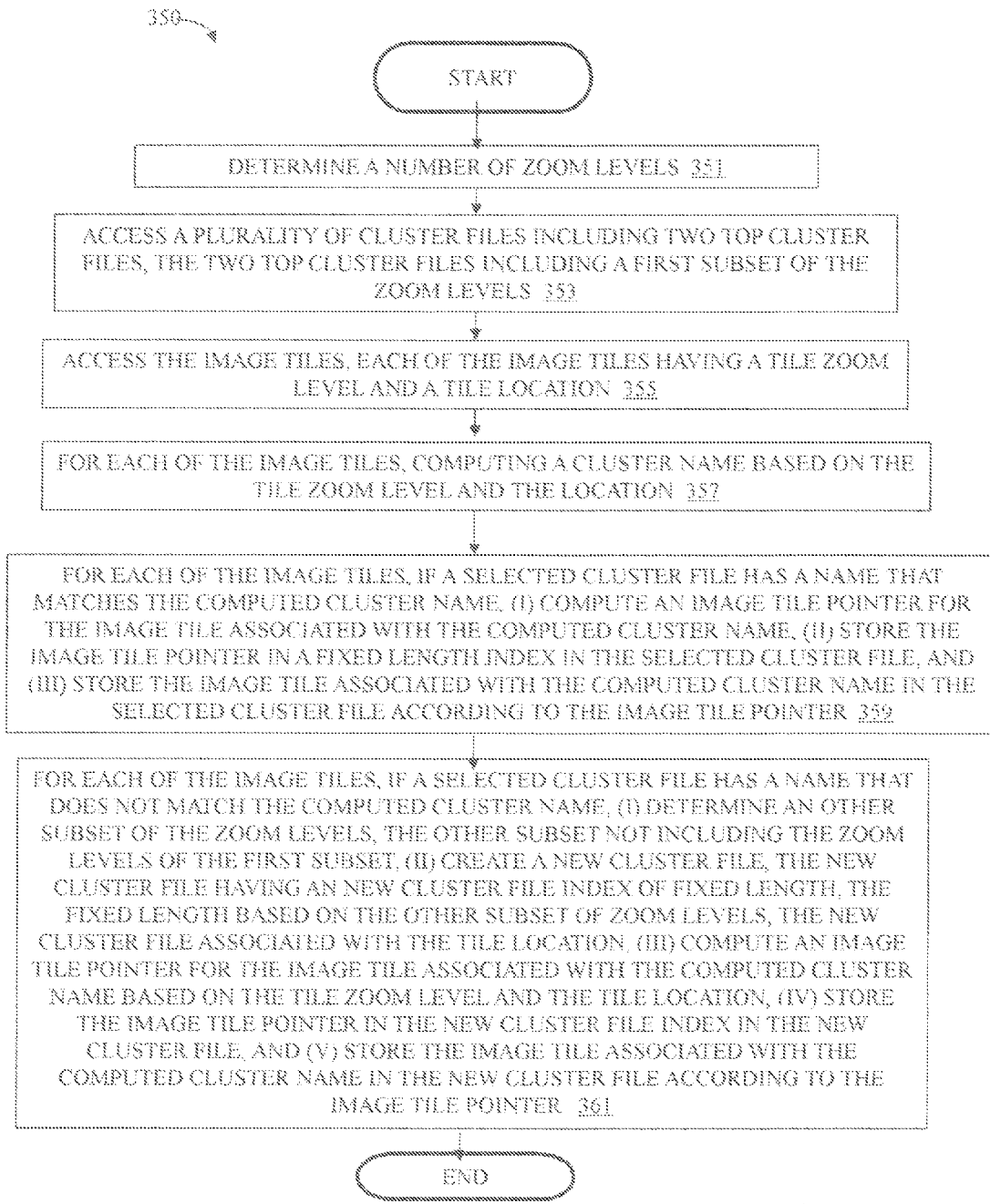
FIG. 15B is a flowchart of the method of the present embodiment for storing image tiles.

Referring now to FIG. 15B, computer-implemented method 350 for storing a dataset of image tiles can include, but is not limited to including, the steps of (a) determining 351 a number of zoom levels, (b) accessing 353 a plurality of cluster files including two top cluster files, the two top cluster files including a first subset of the zoom levels, (c) accessing 355 the image tiles, each of the image tiles having a tile zoom level and a tile location, (d) for each of the image tiles, computing 357 a cluster name based on the tile zoom level and the location, (e) for each 359 of the image tiles, if a selected cluster file from the plurality of cluster files has a name that matches the computed cluster name, (i) computing an image tile pointer for the image tile associated with the computed cluster name, (ii) storing the image tile pointer in a fixed length index in the selected cluster file, and (iii) storing the image tile associated with the computed cluster name in the selected cluster file according to the image tile pointer, and (f) for each 361 of the image tiles, if a selected cluster file from the plurality of cluster files has a name that does not match the computed cluster name, (i) determining an other subset of the zoom levels, the other subset not including the zoom levels of the first subset, (ii) creating a new cluster file as part of the plurality of cluster files, the new cluster file having a new cluster file index of fixed length, the fixed length based on the other subset of zoom levels, the new cluster file associated with the tile location, (iii) computing an image tile pointer for the image tile associated with the computed cluster name based on the tile zoom level and the tile location, (iv) storing the image tile pointer in the new cluster file index in the new cluster file, and (v) storing the image tile associated with the computed cluster name in the new cluster file according to the image tile pointer. Method 300 can optionally include the steps of determining a lowest zoom level in the other subset of zoom levels, copying each of the tile images at the lowest zoom level from each of the new cluster files, and storing each of the copied tiled images into the two top cluster files based on the tile location.

Figures 16A, 16B, 16C:
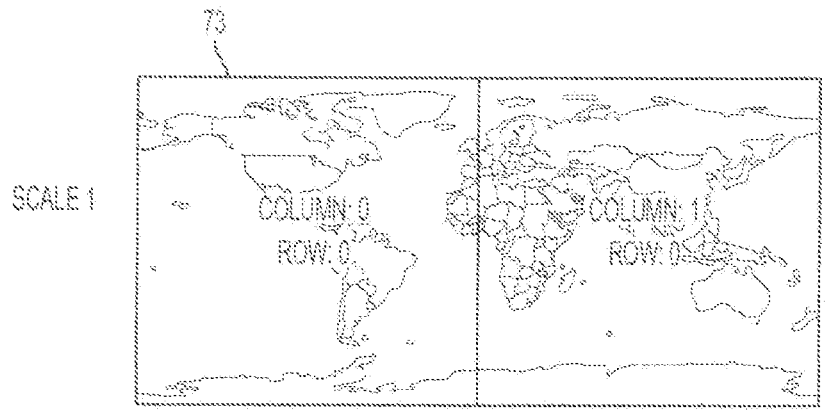
FIG. 16A is a hierarchical diagram of tiled image layers.
FIG. 16B is a pictorial representation of the world divided into clusters.
FIG. 16C is a hierarchical diagram of a five-level cluster.

Referring now to FIG. 16A, tiled image layers follow pyramid type structure 71. Each level has four times the number of tiles as its predecessor. Each lower resolution level is based on the image data from the next higher resolution level. Referring now to FIG. 16B, the cluster grouping system of the present embodiment starts by dividing the world into clusters 73, that is, (0,0), and (0,1). Referring now to FIG. 16C, the structure of five-level cluster 75 is shown. The tiles that fall into the area marked by address (0,0) are stored in cluster (0,0) and all the tiles that fall into the area marked by address (0,1) are stored in cluster (0,1). In this embodiment, no tiles overlap both clusters.

Referring now to FIG. 17A, tile set equation 77 computes the number of tiles for a tile set with L levels, and cluster equation 79 computes the number of tiles for a cluster with L levels. To store tiles in cluster files, the number of levels to be stored is determined. For example, with a base level of seven, two cluster files are needed, each with seven levels of tiles and 5,461 tiles. Because the possible number of tiles is fixed for each cluster, a single fixed length lookup index can be built and stored at the beginning of the cluster file. The index size is the number of possible tiles times the size of the tile address record. After the index, the tile images can be stored sequentially in the file. Because there is an index, there is no need to store the tiles in any particular order. Referring now to FIG. 17B, index section 81 and time image section 83 can be included in a file structure for an exemplary cluster file.

Figure 18A:
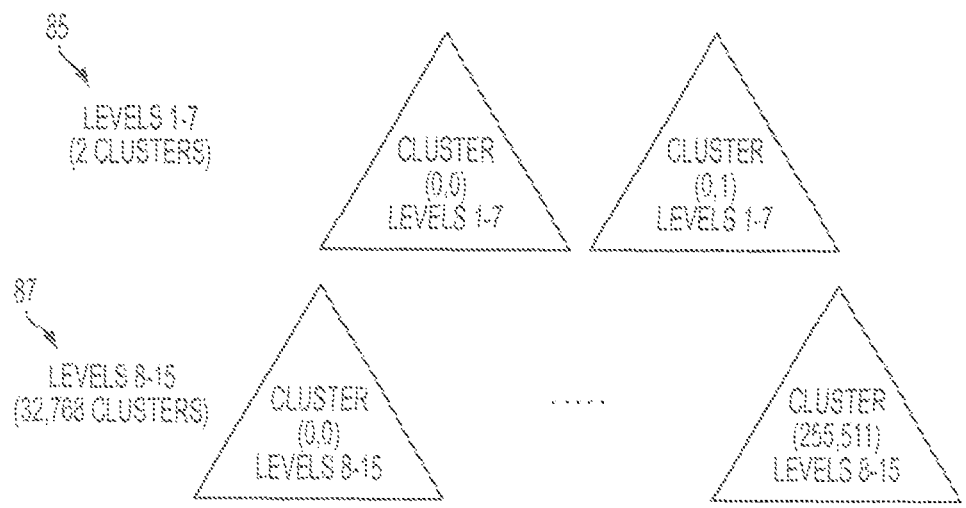
FIG. 18A is a hierarchical diagram of levels and their associated clusters.
Figure 18B:
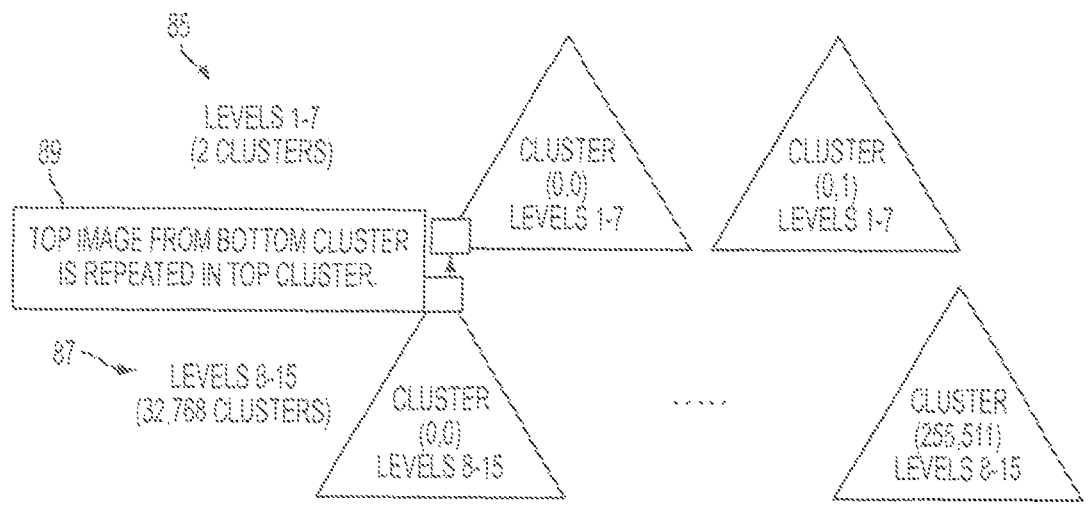
FIG. 18B is the hierarchical diagram of FIG. 18A illustrating in addition storage of the top image

Referring now to FIG. 18A, the present embodiment also accommodates multiple levels of clusters with each level covering a continuous sub-range of levels. For example, a tile set with fifteen scales has two levels of clusters. First level 85 includes tile levels 1-7, while the second level 87 of clusters includes tile levels 8-15. First level 85 includes seven levels, while second level 87 includes eight scales. First level 85 of clusters can only have two clusters, while second level 87 of clusters can include as many clusters as there are tiles in the first tile level of the second cluster level, in the previous example, tile level eight, or 32,768 clusters. In one embodiment, cluster files are only created when there are tiles that belong in the cluster, so that the actual required number of clusters can fluctuate based on the size of the tile set. Referring now to FIG. 18B, to minimize the number of times a file is opened, closed, and accessed, top level image 89 for a subordinate cluster can be duplicated in the first level cluster.

Referring to FIG. 19A, all tiles for a specific zoom level (see FIG. 3A) can be stored in a single file. For each zoom level, there is tiled image file 421 for the tiled images, and there are tiled index file 95 and row index file 411 into the zoomed image file. System 400 (FIG. 21A) of the present embodiment can store a sentinel value, the tile's address, and the tile's size along with the tiled image data sequentially in tiled image file 421. Referring now to FIG. 19B, the system can store only rows in tiled index file 95 in which there are tiles, and can create row index file 411 having either the location of the row's index records from tiled index file 95 if the row has any tiles, or a null value if the row has no tiles, for each row. To retrieve the address for a specific tile, system 400 (FIG. 21A) can seek to the position of the row pointer in row index file 411, read the value, and use the value to position tiled index file 95 if the value is non-null. Further system 400 can seek additional positions for the column index and reading the tile address. Since the tiles do not have to be stored in any particular order, tiles can be written over a period of time, and new tiles can be added to the file by writing them at the end of the file. Referring now to FIGS. 20A-1, 20A-2, 20B-1, 20B-2, 20C-1, and 20C-2, exemplary the output code 97 (FIG. 20A-1) and exemplary the input code 99 (FIG. 20B-2) are the Java code for indexed tile output by zoom level and tile input, respectively.

Figure 21A:
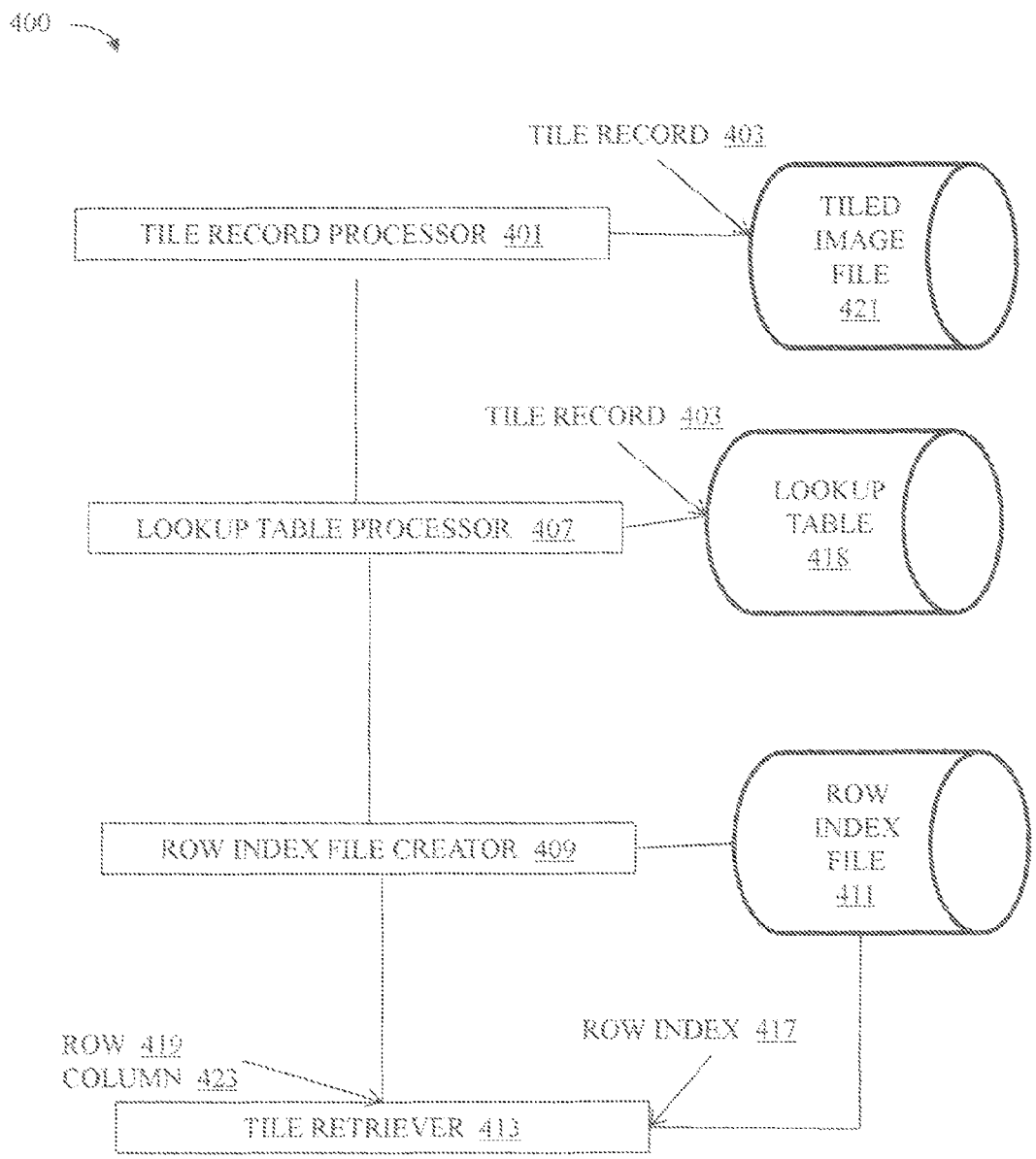
FIG. 21A is a schematic block diagram of the system of the present embodiment for storing and retrieving tiled image data.

Referring now to FIG. 21A, system 400 for storing and retrieving tiled image data can include, but is not limited to including, tile record processor 401 executing, for each of a plurality of tiles at a pre-selected zoom level from the tiled image data, the step of storing tile record 403 in tiled image file 421, tile record 403 being associated with row 419 and column 423. System 400 can also include lookup table processor 407 creating lookup table 418 having a direct-lookup value for tile record 403 at row 419 and column 423 associated with the tiled image, when there are no tile records 403 at first row 417 and column 423 of lookup table 418, storing a null value in lookup table 418 at row 419 and column 423, when there are no tile records 403 in a lookup table row in lookup table 418, omitting the lookup table row from lookup table 418. System 400 can still further include row index file creator 409 creating row index file 411 having a null value for each of the omitted lookup table rows, and tile retriever 413 retrieving an address for a specific tile by executing the steps including, but not limited to seeking to a row position of row 419 associated with tile record 403 in row index file 411, reading row index value 417 at the position, positioning the tile index file according to the row index value 417 if the value is non-null, seeking to a column position for column 423 associated with tile record 403, reading an address associated with tile record 403, and retrieving tile record 403 at the address. Tile record 403 can include, but is not limited to including, a sentinel value, a tile address, a tile size, and a tiled image. Tile record processor 401 can optionally compute the address based on a column index, a row index, and a number of columns.

Figure 21B:
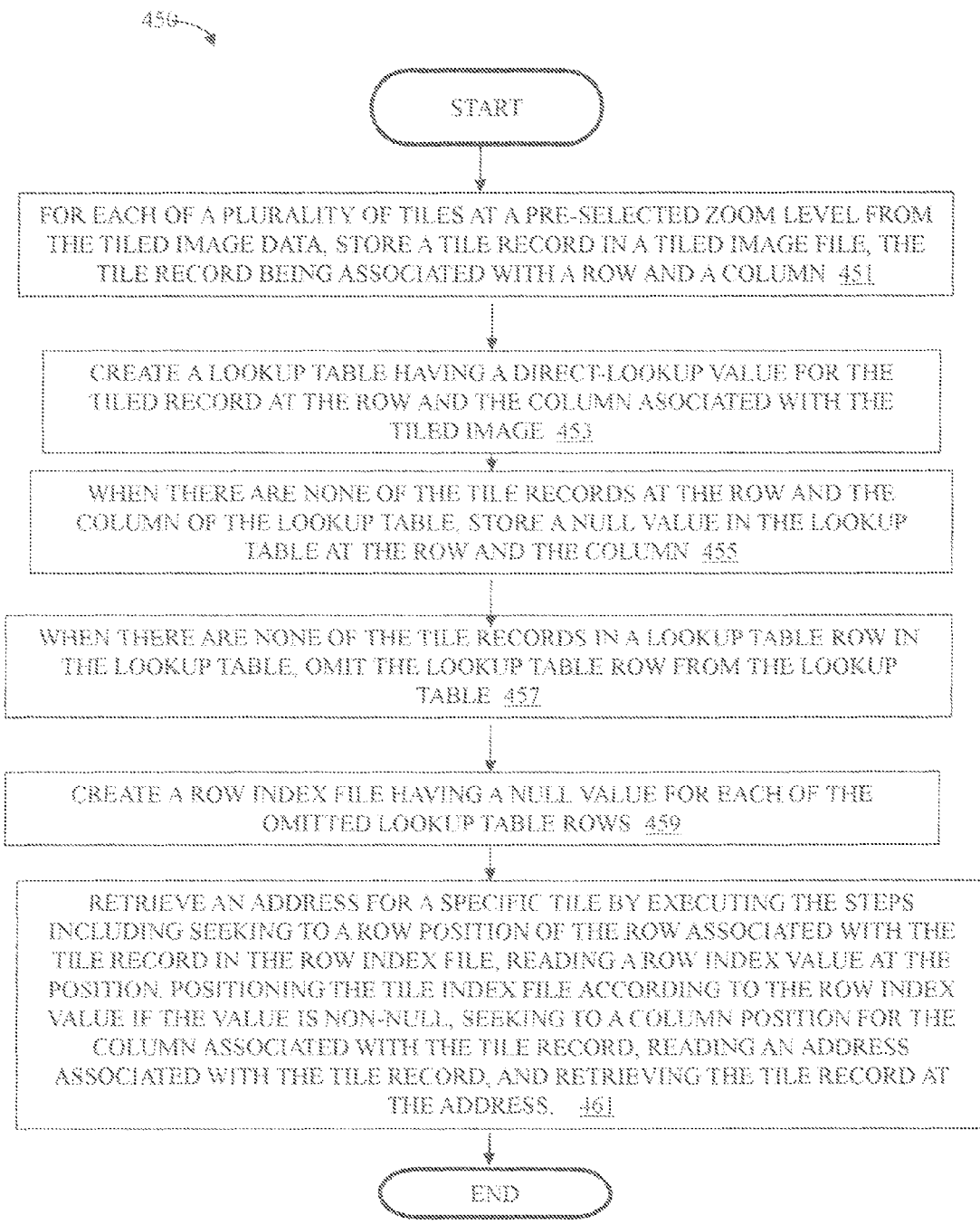
FIG. 21B is a flowchart of the method of the present embodiment for storing and retrieving tiled image data.

Referring now to FIG. 21B, method 450 for storing and retrieving tiled image data can include, but is not limited to including, the steps of for each of a plurality of tiles at a pre-selected zoom level from the tiled image data, storing a tile record in a tiled image file, the tile record being associated with a row and a column, creating a lookup table having a direct-lookup value for the tiled record at the row and the column associated with the tiled image, when there are none of the tile records at the row and the column of the lookup table, storing a null value in the lookup table at the row and the column, when there are none of the tile records in a lookup table row in the lookup table, omit the lookup table row from the lookup table, creating a row index file having a null value for each of the omitted lookup table rows, and retrieving an address for a specific tile by executing the steps including, but not limited to seeking to a row position of the row associated with the tile record in the row index file, reading a row index value at the position, positioning the tile index file according to the row index value if the value is non-null, seeking to a column position for the column associated with the tile record, reading an address associated with the tile record, and retrieving the tile record at the address. The tile record can include, but is not limited to including, a sentinel value, a tile address, a tile size, and a tiled image. Method 450 can optionally include the step of computing the address based on a column index, a row index, and a number of columns.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in FORTRAN and C. The system operates on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIGS. 7B, 12B, 15B, and 21B, methods 150, 250, 350, and 450 can be, in whole or in part, implemented electronically. Signals representing actions taken by elements of systems 100 (FIG. 7A), 200 (FIG. 12A), 300 (FIG. 15A), and 400 (FIG. 21A) and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

The invention has been described with reference to certain embodiments. It will be understood, however, that the invention is not limited to the embodiments discussed above, and that modification and variations are possible within the scope of the appended claims.

What is claimed is:

1. A method for storing a dataset of image tiles comprises the steps of:
    (a) determining a number of zoom levels;
    (b) accessing a plurality of cluster files including two top cluster files, the two top cluster files including a first subset of the zoom levels;
    (c) accessing the image tiles, each of the image tiles having a tile zoom level and a tile location;
    (d) for each of the image tiles, computing a cluster name based on the tile zoom level and the location;
    (e) for each of the image tiles, if a selected cluster file from the plurality of cluster files has a name that matches the computed cluster name,
        (i) computing an image tile pointer for the image tile associated with the computed cluster name;
        (ii) storing the image tile pointer in a fixed length index in the selected cluster file; and
        (iii) storing the image tile associated with the computed cluster name in the selected cluster file according to the image tile pointer; and
    (f) for each of the image tiles, if a selected cluster file from the plurality of cluster files has a name that does not match the computed cluster name,
        (i) determining an other subset of the zoom levels, the other subset not including the zoom levels of the first subset;
        (ii) creating a new cluster file as part of the plurality of cluster files, the new cluster file having a new cluster file index of fixed length, the fixed length based on the other subset of zoom levels, the new cluster file associated with the tile location;
        (iii) computing an image tile pointer for the image tile associated with the computed cluster name based on the tile zoom level and the tile location;
        (iv) storing the image tile pointer in the new cluster file index in the new cluster file; and
        (v) storing the image tile associated with the computed cluster name in the new cluster file according to the image tile pointer.

2. The method as in claim 1 further comprising the step of: determining a lowest zoom level in the other subset of zoom levels.

3. The method as in claim 2 further comprising the steps of:
    copying each of the tile images at the lowest zoom level from each of the new cluster files; and
    storing each of the copied tiled images into the two top cluster files based on the tile location.

4. A system for storing a dataset of image tiles comprises:
    a zoom level processor determining a number of zoom levels;
    a cluster file processor accessing a plurality of cluster files including two top cluster files, the two top cluster files including a first subset of the zoom levels;
    an image tile processor accessing image tiles, each image tile having a tile zoom level and a tile location, wherein for each image tile, said image tile processor computes a cluster name based on tile zoom level and the tile location;
    a tile pointer processor computing, for each image tile, if a selected cluster file from the plurality of cluster files has a name that matches the computed cluster name, an image tile pointer for the image tile associated with the computed cluster name, storing the image tile pointer in a fixed length index in the selected cluster file, and storing the image tile associated with the computed cluster name in the selected cluster file according to the image tile pointer;
    wherein said zoom level processor, for each of the image tiles, if a selected cluster file from the plurality of cluster files has a name that does not match the computed cluster name, determines an other subset of the zoom levels, the other subset not including the zoom levels of the first subset;
    wherein said cluster file processor creates a new cluster file as part of the plurality of cluster files, the new cluster file having a new cluster file index of fixed length, the fixed length based on the other subset of zoom levels, the new cluster file associated with the tile location;
    wherein said tile pointer processor computes an image tile pointer for the image tile associated with the computed cluster name based on the tile zoom level and the tile location, and stores the image tile pointer in the new cluster file index in the new cluster file; and
    wherein said image tile processor stores the image tile associated with the computed cluster name in the new cluster file according to the image tile pointer.

5. The system as in claim 4 wherein said zoom level processor determines a lowest zoom level in the other subset of zoom levels.

6. The system as in claim 4 wherein said image tile processor copies each of the tile images at the lowest zoom level from each of the new cluster files, and stores each of the copied tiled images into the two top cluster files based on the tile location.

* * * * *